United States Patent
Zhuang et al.

(10) Patent No.: US 11,916,783 B2
(45) Date of Patent: Feb. 27, 2024

(54) INFORMATION REPORTING METHOD, INFORMATION PROCESSING METHOD, APPARATUS, AND DEVICE

(71) Applicant: Huawei Technologies Co., Ltd., Shenzhen (CN)

(72) Inventors: Shunwan Zhuang, Beijing (CN); Ping'an Yang, Nanjing (CN); Haibo Wang, Beijing (CN); Yunan Gu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/976,459

(22) Filed: Oct. 28, 2022

(65) Prior Publication Data
US 2023/0048037 A1     Feb. 16, 2023

Related U.S. Application Data

(63) Continuation of application No. PCT/CN2021/090815, filed on Apr. 29, 2021.

(30) Foreign Application Priority Data

Apr. 29, 2020  (CN) .......................... 202010355575.0

(51) Int. Cl.
*H04L 45/44* (2022.01)
*H04L 45/24* (2022.01)
*H04L 45/748* (2022.01)

(52) U.S. Cl.
CPC .............. *H04L 45/44* (2013.01); *H04L 45/24* (2013.01); *H04L 45/748* (2013.01)

(58) Field of Classification Search
CPC ....... H04L 45/44; H04L 45/24; H04L 45/748; H04L 45/123; H04L 45/70; H04L 45/74;
(Continued)

(56) References Cited

U.S. PATENT DOCUMENTS 9,992,106 B2 *   6/2018   Wang ..................... H04L 67/131
11,038,953 B1 *  6/2021   Nayak ..................... H04L 45/70
(Continued)

FOREIGN PATENT DOCUMENTS

CN      101127727 A     2/2008
CN      101155135 A     4/2008
(Continued)

OTHER PUBLICATIONS

Giotsas, V. et al., "Improving the Discovery of IXP Peering Links through Passive BGP Measurements," 16th IEEE Global Internet Symposium, Apr. 14-19, 2013, 6 pages.
(Continued)

*Primary Examiner* — Karen C Tang
(74) *Attorney, Agent, or Firm* — Slater Matsil, LLP

(57) ABSTRACT

Embodiments of this application disclose an information reporting method, an information processing method, an apparatus, and a device. The method in embodiments of this application includes the network device obtains a routing prefix included in local routing information, and information about a neighboring peer set corresponding to the routing prefix, and sends a local route monitoring message including the routing prefix and the information about the neighboring peer set to a first device. The neighboring peer set includes a source peer set and/or a destination peer set, the source peer set includes one or more source peers, the source peer is a peer that advertises original routing information including the routing prefix to the network device, the destination peer set includes one or more destination peers, and the destination peer is a peer to which the network device advertises destination routing information including the routing prefix.

20 Claims, 15 Drawing Sheets

(58) Field of Classification Search
CPC ..... H04L 41/0894; H04L 43/06; H04L 12/12; H04L 45/04; H04L 12/4641; H04L 43/12
USPC .......................................................... 709/238
See application file for complete search history.

(56) References Cited

U.S. PATENT DOCUMENTS

| | | | |
|---|---|---|---|
| 2006/0101157 | A1 | 5/2006 | Eardley |
| 2010/0132039 | A1* | 5/2010 | Ji ........................ H04L 63/1408 726/23 |
| 2016/0226760 | A1* | 8/2016 | Liljenstolpe ............ H04L 45/04 |
| 2016/0248658 | A1* | 8/2016 | Patel ...................... H04L 45/48 |
| 2017/0374174 | A1 | 12/2017 | Evens et al. |
| 2019/0034472 | A1 | 1/2019 | Evens et al. |
| 2019/0179668 | A1* | 6/2019 | Wang .................... G06F 9/4881 |
| 2020/0252333 | A1* | 8/2020 | Mishra ................... H04L 45/16 |
| 2021/0160163 | A1* | 5/2021 | Gray ...................... H04L 69/22 |
| 2021/0344594 | A1* | 11/2021 | Mendez ................. H04L 45/70 |
| 2021/0359929 | A1* | 11/2021 | Cronin ................... H04L 45/02 |
| 2021/0385150 | A1* | 12/2021 | Shrivastava ............ H04L 45/02 |
| 2022/0278921 | A1* | 9/2022 | Singh ..................... H04L 45/123 |

FOREIGN PATENT DOCUMENTS

| | | |
|---|---|---|
| CN | 102394794 A | 3/2012 |
| CN | 102638413 A | 8/2012 |
| CN | 102724130 A | 10/2012 |
| CN | 104052666 A | 9/2014 |
| CN | 105847158 A | 8/2016 |
| CN | 106059793 A | 10/2016 |
| CN | 106059916 A | 10/2016 |
| CN | 106059934 A | 10/2016 |
| CN | 106161256 A | 11/2016 |
| CN | 106169978 A | 11/2016 |
| CN | 106254251 A | 12/2016 |
| CN | 106375353 A | 2/2017 |
| CN | 106506376 A | 3/2017 |
| CN | 107517143 A | 12/2017 |
| CN | 108123848 A | 6/2018 |
| CN | 108259324 A | 7/2018 |
| CN | 110191059 A | 8/2019 |
| CN | 110971522 A | 4/2020 |
| CN | 110971524 A | 4/2020 |
| WO | 2016123928 A1 | 8/2016 |
| WO | 2016177131 A1 | 11/2016 |
| WO | 2016177184 A1 | 11/2016 |
| WO | 2017031984 A1 | 3/2017 |
| WO | 2017036163 A1 | 3/2017 |
| WO | 2017036165 A1 | 3/2017 |

OTHER PUBLICATIONS

Li, W. et al., "Design of BGP Routing Stability Monitoring Tool Based on Routing Updates," Computer Engineering and Applications, 2010, 46 (8), Mar. 2010, 4 pages (with English Abstract).
F. Xu et al., "BGP Route Policy and Attribute Trace Using BMP," draft-xu-grow-bmp-route-policy-attr-trace-04, Jul. 9, 2020, XP015137167, 15 pages.
T. Evens et al., "Support for Adj-RIB-Out in the BGP Monitoring Protocol (BMP)," Internet Engineering Task Force (IETF), Nov. 2019, XP015135168, 6 pages.

* cited by examiner

INFORMATION REPORTING METHOD, INFORMATION PROCESSING METHOD, APPARATUS, AND DEVICE

CROSS-REFERENCE TO RELATED APPLICATIONS

This application is a continuation of International Application No. PCT/CN2021/090815, filed on Apr. 29, 2021, which claims priority to Chinese Patent Application No. 202010355575.0, filed on Apr. 29, 2020. The disclosures of the aforementioned applications are hereby incorporated by reference in their entireties.

TECHNICAL FIELD

This application relates to the communications field, and in particular, to an information reporting method, an information processing method, an apparatus, and a device.

BACKGROUND

The border gateway protocol (BGP) monitoring protocol (BMP) is a protocol used to monitor a running status of a network device in a BGP network architecture. According to this protocol, a BMP client needs to report information that indicates a running status of the BMP client to a BMP server, such as establishment information, disconnection information, and routing information of a peer relationship, so that the BMP server can monitor the BMP client.

The routing information reported by the BMP client to the BMP server is local routing information, and the local routing information mainly includes a route prefix, a local internet protocol (IP) address, attribute information, and the like. However, reporting only the local routing information means a relatively small information amount for the BMP server to monitor the running status of the BMP client, and it is difficult to meet an increasing requirement for comprehensive monitoring.

SUMMARY

Embodiments of this application provide an information reporting method, an information processing method, an apparatus, and a device, to increase an amount of reported BGP information and meet a monitoring requirement.

According to a first aspect, an embodiment of this application provides an information reporting method. The method may be applied to a network device, for example, a router or a switch. The method includes the following steps. First, the network device obtains a routing prefix included in local routing information and information about a neighboring peer set corresponding to the routing prefix. The network device may obtain related information of the neighboring peer through a session with the neighboring peer. The neighboring peer set may include a source peer set and/or a destination peer set. Information about the source peer set may include one or more source peers, and the destination peer set may include one or more destination peers. The source peer is a peer that advertises original routing information (unprocessed route message) to the network device, and the destination peer is a peer to which the network device advertises destination routing information. After obtaining the information about the neighboring peer set, the network device may carry the routing prefix and the information about the neighboring peer set in a local route monitoring message and report the routing prefix and the information about the neighboring peer set to the first device, so that the first device can obtain the information about the neighboring peer set of the network device. In this way, in addition to the routing prefix, the information reported by the network device to the first device further includes related information of the source peer set and/or the destination peer set, thereby increasing an amount of information received by the first device and meeting a monitoring requirement.

Optionally, the information about the neighboring peer set obtained by the network device may include information about a source peer set. The information about the source peer set may include one or more of an identifier of any one or more source peers, address family information of the source peer, distinguisher information of the source peer, and the like in the source peer set. The identifier of the source peer may include information such as an IP address and a router ID of the source peer, and is used to indicate a source of the original routing information and reflect identity information of the source peer. The address family information of the source peer may include an address family identifier (AFI) of the source peer and/or a subsequent address family identifier (SAFI) of the source peer, and is used to indicate information about an address family or a subsequent address family of the source peer and reflect a network layer protocol that is applicable to the source peer. The distinguisher information of the source peer may include peer distinguisher information of the source peer, and is used to indicate identity information of the source peer in a VPN scenario.

Optionally, information about the destination peer set obtained by the network device may include any one or more of an identifier of the destination peer and/or address family information of the destination peer in the destination peer set. The identifier of the destination peer may include information such as an IP address and a router ID of the destination peer, and is used to indicate a destination of the original routing information and reflect identity information of the destination peer. The address family information of the destination peer may include an address family identifier of the destination peer and/or a subsequent address family identifier of the destination peer, and is used to indicate information of an address family or a subsequent address family of the destination peer and reflect a network layer protocol that is applicable to the destination address peer.

Optionally, when the network device reports the local route monitoring message to the first device, the information about the neighboring peer set may be carried in a type length value (TLV) field of the local route monitoring message.

Optionally, considering that the neighboring peer set may include the source peer set and/or the destination peer set, and the information about the neighboring peer set may include the information about the source peer set and/or the information about the destination peer set, the TLV field may also include a first TLV field and/or a second TLV field, respectively used to carry the information about the source peer set and the information about the destination peer set.

Optionally, the network device may select a source peer in the source peer set. The source peer set may include a source selected peer and/or a source candidate peer. When selecting the source peer, the network device may select one or more pieces of first original routing information from the original routing information based on the original routing information or other information sent by the source peer, and use one or more source peers that send the first original routing information as the source selected peers. In addition, the network device may use one or more pieces of unselected original routing information as second original routing information, and use one or more source peers that send the second original routing information as the source candidate peers.

Optionally, the network device also selects a destination peer. The network device may select one or more destination peers from the destination peer set as destination selected peers, and the destination selected peers send the destination routing information. The network device may also use an unselected destination peer as a destination candidate peer, and temporarily does not send the destination routing information to the destination candidate peer.

Optionally, after reporting the local route monitoring message to the first device, the network device may further receive a first control message delivered by the first device, and adjust the destination selected peer and/or the destination candidate peer based on the first control message. The first control message may include first indication information and/or second indication information, the first indication message may be used to indicate the network device to determine the one or more destination selected peers as the destination candidate peers, and the second indication message may be used to indicate the network device to determine one destination candidate peer as the destination selected peer. By receiving the first control message delivered by the first device, the network device may adjust the destination selected peer and/or the destination candidate peer based on the first indication information and/or the second indication information, so as to send the destination routing information to a specific destination peer according to a requirement of the first device or a network administrator, thereby adjusting the routing prefix and a transmission direction of a data stream.

Optionally, the network device may also receive a second control message delivered by the first device. The second control message may include a first routing policy set and/or the second routing policy set. The first routing policy set may include routing policies of the one or more source peers. The network device may adjust attribute information of the source peer according to the routing policy of the source peer, so as to re-determine a source selected peer and/or a source candidate peer from the one or more source peers in the source peer set. The second routing policy set may include routing policies of the one or more destination peers. The network device may adjust attribute information of the destination peer according to the routing policy of the destination peer. After the one or more destination peers serve as the source peers and send new original routing information to another device, the another device may select one or more pieces of new first original routing information from one or more pieces of new original routing information based on the adjusted attribute information, thereby adjusting the source selected peer and/or the source candidate peer of a lower-level device of the destination peer. In this way, according to the first routing policy set and the second routing policy set included in the second control message, the network device may adjust the attribute information of the one or more source peers and/or the one or more destination peers, so that the network device and/or the lower-level device of the destination peer adjust/adjusts a determined source selected peer and/or source candidate peer, thereby adjusting the source selected peer to implement adjustment of the routing prefix and the transmission direction of the data stream.

Optionally, because the information reporting method provided in this embodiment of this application is proposed based on the BGP protocol, the local route monitoring message may comply with the BGP protocol, and the local route monitoring message may include a peer type field, a value of the field is 3, and the field is used to identify the local route monitoring message.

According to a second aspect, an embodiment of this application further provides an information processing method. The method may be applied to a first device, for example, a server or a controller. The method includes the following steps. First, the first device receives a local route monitoring message sent by a network device. The local route monitoring message may include a routing prefix and information about a neighboring peer set corresponding to the routing prefix. The neighboring peer set may be obtained by the network device, and include a source peer set and/or a destination peer set. Information about the source peer set may include one or more source peers, and the destination peer set may include one or more destination peers. The source peer is a peer that sends original routing information (unprocessed route message) to the network device, and the destination peer is a peer to which the network device sends destination routing information. After receiving the local route monitoring message sent by the network device, the first device may perform corresponding processing on the routing prefix and the information about the neighboring peer set. For example, the first device may store the routing prefix and the information about the neighboring peer set, or display a connection relationship between the network device and each peer in a topology diagram. In this way, in addition to the routing prefix received by the network device, the first device may further obtain related information about the source peer set and/or the destination peer set of the network device from the received local route monitoring message. The obtained information is richer, and can meet complex monitoring requirements. Based on the information, the network device or a network administrator can easily manage various devices in a network.

Optionally, the information about the neighboring peer set may include the information about the source peer set. The information about the source peer set may include one or more of an identifier of any one or more source peers, address family information of the source peer, distinguisher information of the source peer in the source peer set. The identifier of the source peer may include information such as an IP address and a router ID of the source peer, and is used to indicate a source of the original routing information and reflect identity information of the source peer. The address family information of the source peer may include an address family identifier (AFI) of the source peer and/or a subsequent address family identifier (SAFI) of the source peer, and is used to indicate information about an address family or a subsequent address family of the source peer and reflect a network layer protocol that is applicable to the source peer. The distinguisher information of the source peer may include peer distinguisher information of the source peer, and is used to indicate identity information of the source peer in a VPN scenario.

Optionally, information about the destination peer set may include any one or more of an identifier of the destination peer and/or address family information of the destination peer in the destination peer set. The identifier of the destination peer may include information such as an IP address and a router ID of the destination peer, and is used to indicate a destination of the original routing information and reflect identity information of the destination peer. The address family information of the destination peer may include an address family identifier of the destination peer and/or a subsequent address family identifier of the destination peer, and is used to indicate information of an address family or a subsequent address family of the destination peer and reflect a network layer protocol that is applicable to the destination address peer.

Optionally, after receiving the local route monitoring message, the first device may check a type length value carried in a local routing message, and obtain the information about the neighboring peer set from a TLV field of the local route monitoring message.

Optionally, considering that the neighboring peer set may include the source peer set and/or the destination peer set, and the information about the neighboring peer set may include the information about the source peer set and/or the information about the destination peer set, the TLV field may also include a first TLV field and/or a second TLV field, respectively used to carry the information about the source peer set and the information about the destination peer set.

Optionally, the network device may select a source peer in the source peer set. The source peer set may include a source selected peer and/or a source candidate peer. When selecting the source peer, the network device may select one or more pieces of first original routing information from the original routing information based on the original routing information or other information sent by the source peer, and use one or more source peers that send the first original routing information as the source selected peers. In addition, the network device may use one or more pieces of unselected original routing information as second original routing information, and use one or more source peers that send the second original routing information as the source candidate peers.

Optionally, the network device also selects a destination peer. The network device may select one or more destination peers from the destination peer set as destination selected peers, and the destination selected peers send the destination routing information. The network device may also use an unselected destination peer as a destination candidate peer, and temporarily does not send the destination routing information to the destination candidate peer.

Optionally, after receiving the local route monitoring message, the first device may evaluate the one or more destination selected peers currently selected by the network device, and determine whether the one or more destination selected peers and/or one or more destination candidate peers currently determined by the network device need to be adjusted. When the first device determines that the destination selected peer and/or the destination candidate peer currently selected by the network device need/needs to be adjusted, the first device may deliver a first control message to the network device. The first control message may include first indication information and/or second indication information, the first indication message may be used to indicate the network device to determine the one or more destination selected peers as the candidate peers, and the second indication message may be used to indicate the network device to determine one destination candidate peer as the destination selected peer. By receiving the first control message delivered by the first device, the network device may adjust the destination selected peer and/or the destination candidate peer based on the first indication information and/or the second indication information, so as to send the destination routing information to a specific destination peer according to a requirement of the first device or a network administrator, thereby adjusting the routing prefix and a transmission direction of a data stream.

Optionally, the first indication information and the second indication information that are included in the first control message may be generated by the first device based on the local route monitoring message. The first device may obtain the first indication information based on the routing prefix and information about the destination selected peer set, or may obtain the second indication information based on the routing prefix and information about the destination candidate peer set. By processing the information about the destination peer set and the routing prefix, the first device can better determine whether the destination selected peer and the destination candidate peer currently determined by the network device need to be changed.

Optionally, after receiving the local route monitoring message, the first device may also evaluate attribute information of the source peer and the destination peer of the network device, and determine whether the current attribute information of the source peer and the destination peer of the network device needs to be adjusted. When the first device determines that the attribute information of the source peer and/or the destination peer currently selected by the network device needs to be adjusted, the first device may deliver a second control message to the network device. The second control message may include a first routing policy set and/or a second routing policy set. The first routing policy set may include routing policies of the one or more source peers, and is used to adjust attribute information of the one or more source peers. After adjusting the attribute information of the one or more source peers, the network device may re-determine a source selected peer and/or a source candidate peer from the one or more source peers in the source peer set. The second routing policy set may include routing policies of the one or more destination peers, and is used to adjust attribute information of the one or more destination peers. After the attribute information of the one or more destination peers is adjusted, when the one or more destination peers serve as the source peers and send new original routing information to another device, the another device may select one or more pieces of new first original routing information from one or more pieces of new original routing information based on the adjusted attribute information, thereby adjusting the source selected peer and/or the source candidate peer of a lower-level device of the destination peer. In this way, by delivering the second control message including the first routing policy set and the second routing policy set to the network device, the first device may control the network device to adjust the attribute information of the one or more source peers and/or the one or more destination peers, so that the network device and/or the lower-level device of the destination peer adjust/adjusts a determined source selected peer and/or source candidate peer, thereby adjusting the source selected peer to implement adjustment of the routing prefix and the transmission direction of the data stream.

Optionally, the first routing policy set and the second routing policy set included in the second control message may be generated by the first device based on the local route monitoring message. The first device may obtain the first routing policy set based on the routing prefix and information about the source peer set, or may obtain the second routing policy set based on the routing prefix and information about the destination peer set. By processing the information about the neighboring peer set and the routing prefix, the first device can better determine whether the routing prefix and the transmission direction of the data stream currently determined by the network device need to be adjusted.

Optionally, after receiving the local route monitoring message sent by the network device, the first device may parse the local route monitoring message, and generate a correspondence between the routing prefix and the information about the neighboring peer set, so as to determine a source and a destination of the routing prefix, and implement monitoring of a direction of the routing prefix.

Optionally, because the information reporting method provided in this embodiment of this application is proposed based on the BGP protocol, the local route monitoring message may comply with the BGP protocol, and the local route monitoring message may include a peer type field, a value of the field is 3, and the field is used to identify the local route monitoring message.

According to a third aspect, an embodiment of this application further provides an information reporting apparatus, applied to a network device. The apparatus includes: an obtaining unit, configured to obtain a routing prefix included in local routing information and information about a neighboring peer set corresponding to the routing prefix, where the neighboring peer set includes a source peer set and/or a destination peer set, the source peer set includes one or more source peers, the source peer is a peer that advertises original routing information including the routing prefix to the network device, the destination peer set includes one or more destination peers, and the destination peer is a peer to which the network device advertises destination routing information including the routing prefix; and a sending unit, configured to send a local route monitoring message to a first device, where the local route monitoring message includes the routing prefix and the information about the neighboring peer set.

Optionally, information about the source peer set includes one or more pieces of the following information of each of the one or more source peers: an identifier of the source peer, address family information of the source peer, and distinguisher information of the source peer.

Optionally, information about the destination peer set includes one or more pieces of the following information of each of the one or more destination peers: an identifier of the destination peer and/or address family information of the destination peer.

Optionally, the information about the neighboring peer set is carried in a type length value TLV field of the local route monitoring message.

Optionally, the TLV field includes a first TLV field and/or a second TLV field, the first TLV field carries the information about the source peer set, and the second TLV field carries information about the destination peer.

Optionally, the source peer set includes a source selected peer set and/or a source candidate peer set.

The original routing information includes first original routing information. The first original routing information is original routing information that is selected by the network device, the source selected peer set includes one or more source selected peers, and the source selected peer is a source peer that advertises the first original routing information to the network device.

The original routing information includes second original routing information. The second original routing information is original routing information that is not selected by the network device, the source candidate peer set includes one or more source candidate peers, and the source candidate peer is a source peer that advertises the second original routing information to the network device.

Optionally, the destination peer set includes a destination selected peer set and/or a destination candidate peer set.

The destination selected peer set includes one or more destination selected peers, and the destination selected peer is a peer to which the network device has advertised the destination routing information.

The destination candidate peer set includes one or more destination candidate peers, and the destination candidate peer is a peer to which the network device alternatively advertises but has not advertised the destination routing information.

Optionally, the apparatus further includes a first receiving unit.

The first receiving unit is configured to receive a first control message from the first device. The first control message includes first indication information and/or second indication information, the first indication information is used to indicate to determine one or more destination selected peers in the destination selected peer set as target candidate peers, and the second indication information is used to indicate the network device to determine one or more destination candidate peers in the destination candidate peer set as destination selected peers.

Optionally, the original routing information includes attribute information of the source peer, the destination routing information includes attribute information of the destination peer, and the apparatus further includes a second receiving unit.

The second receiving unit is configured to receive a second control message from the first device. The second control message includes a first routing policy set and/or a second routing policy set.

The first routing policy set includes routing policies of the one or more source peers. The routing policy of the source peer is used to adjust the attribute information of the source peer.

The second routing policy set includes routing policies of the one or more destination peers. The routing policy of the destination peer is used to adjust the attribute information of the destination peer.

Optionally, the local route monitoring message complies with the border gateway protocol BGP protocol, the local route monitoring message includes a peer type field, and a value of the peer type field is 3.

According to a fourth aspect, an embodiment of this application further provides an information processing apparatus, applied to a first device. The apparatus includes: a receiving unit, configured to receive a local route monitoring message sent by a network device, where the local route monitoring message includes a routing prefix included in local routing information of the network device and information about a neighboring peer set corresponding to the routing prefix, the neighboring peer set includes a source peer set and/or a destination peer set, the source peer set includes one or more source peers, the source peer is a peer that advertises original routing information including the routing prefix to the network device, the destination peer set includes one or more destination peers, and the destination peer is a peer to which the network device advertises destination routing information including the routing prefix; and a processing unit, configured to perform corresponding processing based on the routing prefix and the information about the neighboring peer set.

Optionally, information about the source peer set includes one or more pieces of the following information of each of the one or more source peers: an identifier of the source peer, address family information of the source peer, and distinguisher information of the source peer.

Optionally, information about the destination peer set includes one or more pieces of the following information of each of the one or more destination peers: an identifier of the destination peer and/or address family information of the destination peer.

Optionally, the information about the neighboring peer set is carried in a type length value TLV field of the local route monitoring message.

Optionally, the TLV field includes a first TLV field and/or a second TLV field, the first TLV field carries the information about the source peer set, and the second TLV field carries information about the destination peer.

Optionally, the source peer set includes a source selected peer set and/or a source candidate peer set.

The original routing information includes first original routing information. The first original routing information is original routing information that is selected by the network device, the source selected peer set includes one or more source selected peers, and the source selected peer is a source peer that advertises the first original routing information to the network device.

The original routing information includes second original routing information. The second original routing information is original routing information that is not selected by the network device, the source candidate peer set includes one or more source candidate peers, and the source candidate peer is a source peer that advertises the second original routing information to the network device.

Optionally, the destination peer set includes a destination selected peer set and/or a destination candidate peer set.

The destination selected peer set includes one or more destination selected peers, and the destination selected peer is a peer to which the network device has advertised the destination routing information.

The destination candidate peer set includes one or more destination candidate peers, and the destination candidate peer is a peer to which the network device alternatively advertises but has not advertised the destination routing information.

Optionally, the processing unit is configured to send a first control message to the network device. The first control message includes first indication information and/or second indication information, the first indication information is used to indicate to determine one or more destination selected peers in the destination selected peer set as destination candidate peers, and the second indication information is used to indicate the network device to determine one or more destination candidate peers in the destination candidate peer set as destination selected peers.

Optionally, the apparatus further includes a first information generation unit.

The first information generation unit is configured to: obtain the first indication information based on the routing prefix and information about the destination selected peer set; and/or obtain the second indication information based on the routing prefix and information about the destination candidate peer set.

Optionally, the processing unit is configured to send a second control message to the network device. The second control message includes a first routing policy set and/or a second routing policy set included in the second control message.

The first routing policy set includes routing policies of the one or more source peers. The routing policy of the source peer is used to adjust attribute information of the source peer.

The second routing policy set includes routing policies of the one or more destination peers. The routing policy of the destination peer is used to adjust attribute information of the destination peer.

Optionally, the apparatus further includes a second information generation unit.

The second information generation unit is configured to: obtain the first routing policy set based on the routing prefix and information about the source peer set; and/or obtain the second routing policy set based on the routing prefix and information about the destination peer set.

Optionally, the processing unit is configured to generate a correspondence between the routing prefix and the information about the neighboring peer set.

Optionally, the local route monitoring message complies with the border gateway protocol BGP protocol, the local route monitoring message includes a peer type field, and a value of the peer type field is 3.

According to a fifth aspect, an embodiment of this application further provides a network device. The network device includes at least one processor, the at least one processor is coupled to at least one memory, and the at least one processor is configured to execute a computer program or instructions stored in the at least one memory, so that the network device performs the resource allocation method according to the first aspect.

According to a sixth aspect, an embodiment of this application further provides a first device. The first device includes at least one processor, the at least one processor is coupled to at least one memory, and the at least one processor is configured to execute a computer program or instructions stored in the at least one memory, so that the first device performs the resource allocation method according to the second aspect.

According to a seventh aspect, an embodiment of this application further provides a monitoring system, including a network device and a first device. The network device is configured to obtain a routing prefix included in local routing information and information about a neighboring peer set corresponding to the routing prefix. The neighboring peer set includes a source peer set and/or a destination peer set, the source peer set includes one or more source peers, the source peer is a peer that advertises original routing information including the routing prefix to the network device, the destination peer set includes one or more destination peers, and the destination peer is a peer to which the network device advertises destination routing information including the routing prefix. The network device is further configured to send a local route monitoring message to the first device. The local route monitoring message includes the routing prefix and the information about the neighboring peer set.

The first device is configured to receive the local route monitoring message sent by the network device. The local route monitoring message includes the routing prefix included in the local routing information of the network device and the information about the neighboring peer set corresponding to the routing prefix. The first device is further configured to perform corresponding processing based on the routing prefix and the information about the neighboring peer set.

According to an eighth aspect, an embodiment of this application further provides a computer-readable storage medium, including a computer program. When the computer program runs on a computer, the computer is enabled to perform the resource allocation method according to the first aspect or the second aspect.

According to a ninth aspect, an embodiment of this application further provides a chip, including a processor and an interface circuit. The interface circuit is configured to receive instructions and transmit the instructions to the processor. The processor is configured to perform the method according to the first aspect or the second aspect.

DETAILED DESCRIPTION OF ILLUSTRATIVE EMBODIMENTS

A border gateway protocol (BGP) network architecture includes a plurality of interconnected network devices, used to transmit information between two or more different autonomous systems (AS). Any two network devices that can transmit routing messages to each other are called peers. The BGP monitoring protocol (BMP) may monitor a network device in the BGP network architecture. In a conventional BMP protocol, a BMP server may monitor a network device by using a message reported by the network device.

Figure 1:
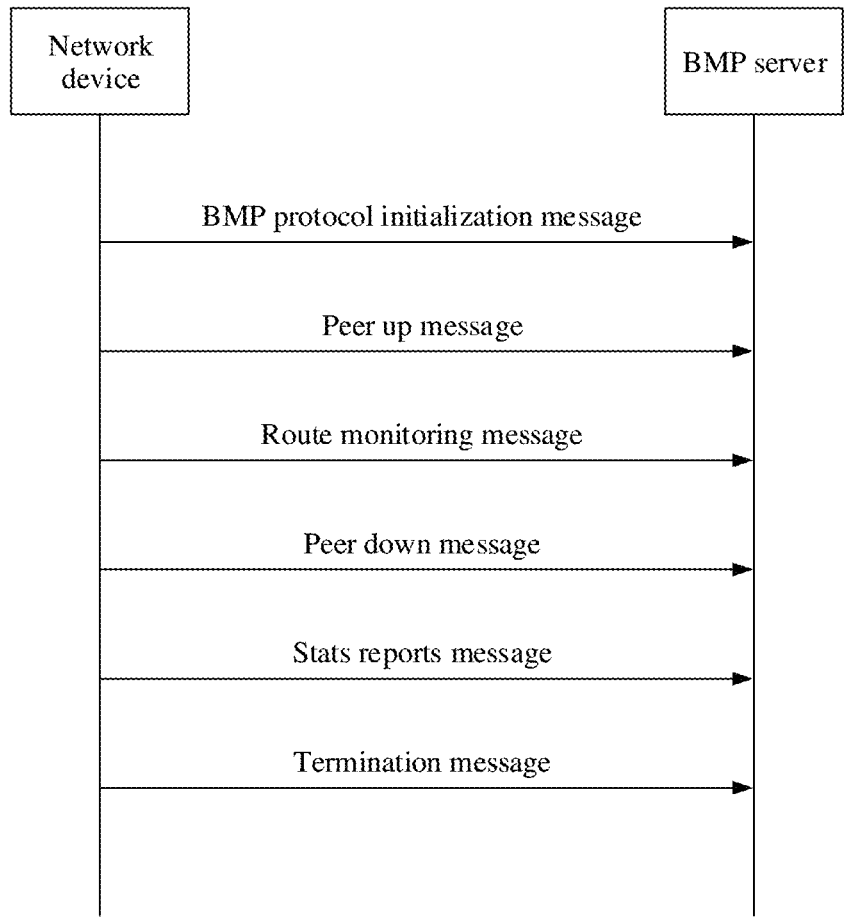
FIG. 1 is a signaling interaction diagram based on a BMP protocol according to an embodiment of this application.

FIG. 1 is a signaling interaction diagram based on a BMP protocol. In the figure, a network device may be a device such as a router or a switch, and a BMP server may be a server, or may be a network device such as a terminal device or a controller. Messages reported by the network device to the BMP server may include a BMP protocol initialization message, a peer up notification (PU) message, a route monitoring (RM) message, and a peer down notification (PD) message, a stats reports (SR) message, a termination message, and the like. The RM message is used to report local routing information of the network device to the BMP server, so that the BMP server monitors the router. The RM message used to report the local routing information may be referred to as a local route monitoring message.

Figure 2:
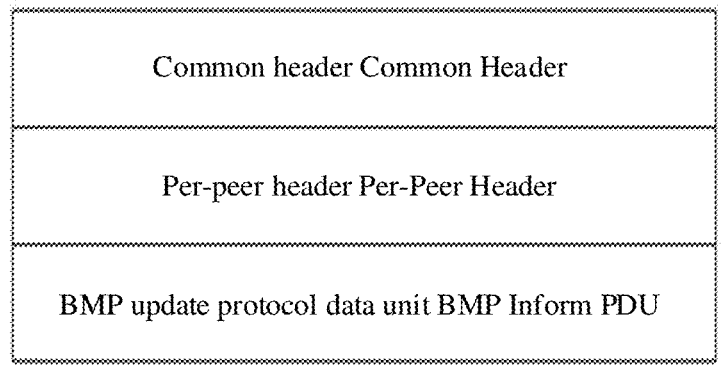
FIG. 2 is a schematic diagram of a format of a route monitoring RM message according to an embodiment of this application.

Refer to FIG. 2. FIG. 2 is a schematic diagram of a format of the RM message. In FIG. 2, the RM message includes a common header, a per-peer header, and a BMP update protocol data unit (BMP update protocol data unit, BMP update PDU).

Figure 3:
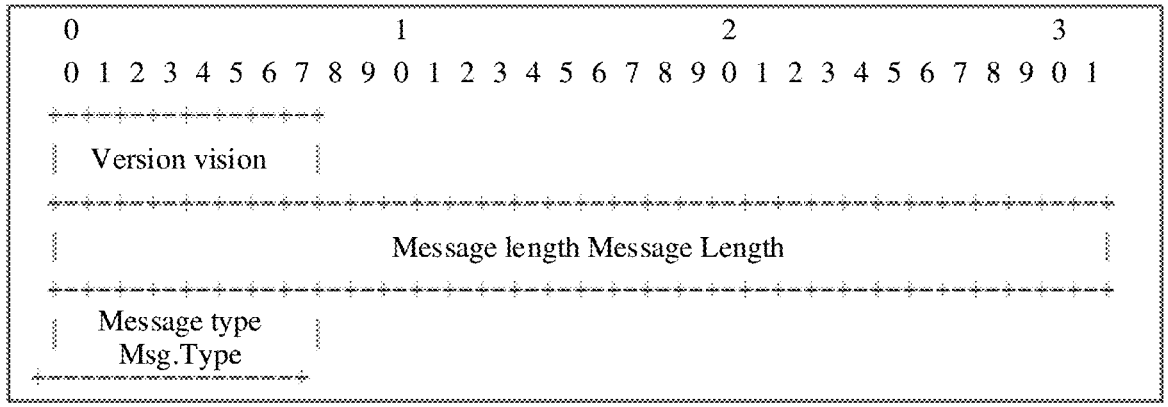
FIG. 3 is a schematic diagram of a format of a common header field according to an embodiment of this application.

Refer to FIG. 3. The figure is a schematic diagram of a format of the common header. It can be seen from the figure that, the common header includes a version field, a message length field, and a message type (Msg. Type) field. The version field carries a version number of a BMP notification message, the message length field carries a length value of the BMP notification message, and the Msg. Type field carries a type value corresponding to the BMP notification message.

Figure 4:
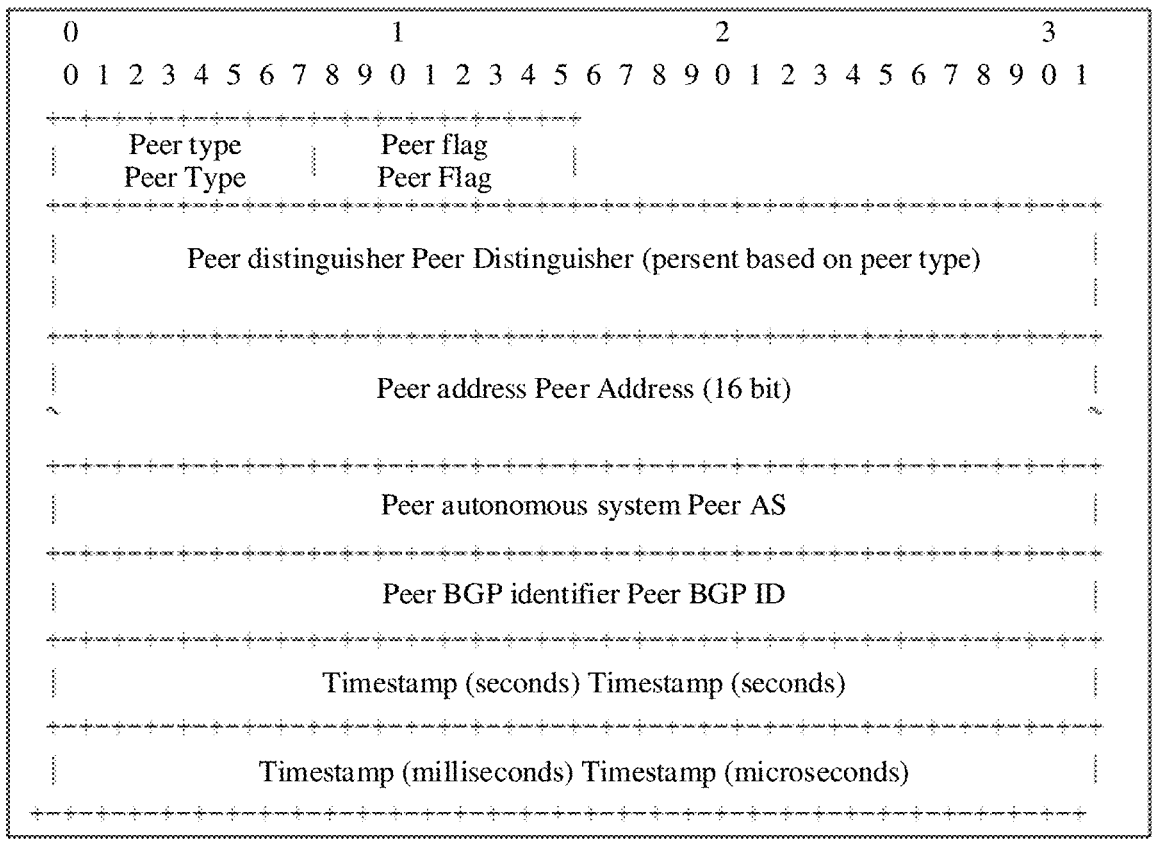
FIG. 4 is a schematic diagram of a format of a per-peer header field according to an embodiment of this application.

Refer to FIG. 4. The figure is a schematic diagram of a format of the per-peer header. It can be seen from the figure that, the per-peer header includes a peer type field, a peer flag field, a peer distinguisher field, a peer address field, a peer autonomous system (peer AS) field, a peer BGP identifier (peer BGP ID) field, a timestamp (seconds) field, and a timestamp (milliseconds) field.

The peer type field carries a value indicating a peer type. The peer flag field carries peer flag bit information. The peer distinguisher field carries peer distinguisher information, and a value of the peer distinguisher field is 0 or a route distinguisher (RD) in a local virtual routing forwarding (VRF) view. The peer address field carries a peer address, and a value of the peer address field is 0. The peer AS field carries a peer autonomous system identifier, and a value of the peer AS field is a global autonomous system value or a default AS value of a BGP instance. The peer BGP ID field carries a peer BGP identifier, and a value of the peer BGP ID field is a global router identity (router ID) of a local BGP instance or a router ID configured in the VRF view. The timestamp field carries a time when the BMP notification message is sent, includes a timestamp in seconds and a timestamp in milliseconds, which are respectively indicated by a total quantity of seconds and a total quantity of milliseconds from 00:00 on Jan. 1, 1970 to a moment when the RM information is sent.

When monitoring the network device, the BMP server receives the local routing information from the network device, including information such as a routing prefix and a local internet protocol (IP) address of the network device. These messages are collectively referred to as the local routing information, and may be carried in a type length value of the BMP update PDU. However, the local routing information includes only the routing prefix and related information of the network device that sends the RM message, and does not include related information of a peer that sends the routing prefix to the network device or information of a peer that receives the routing prefix sent by the network device. Therefore, some specific monitoring requirements cannot be met. For example, in the local routing information sent by the network device, the BMP server can only determine the local routing information of the network device, but cannot determine a peer or peers from which the local routing information comes, and cannot determine a peer or peers to which the routing prefix is sent either.

Main terms in embodiments of this application are explained below with reference to the foregoing content.

Local routing information: local routing information stored in the network device.

Neighboring peer set: The neighboring peer set may include one or more neighboring peers. A neighboring peer of the network device is another network device that establishes a BGP session with the network device.

Source peer set: The source peer set may include one or more source peers. A BGP session is established between the source peer and the network device, and the source peer may send original routing information to the network device.

Source selected peer set: The source selected peer set may include one or more source selected peers. The network device may select first original routing information among the original routing information sent by the source peer, and use the source peer that advertises the first original routing information as the source selected peer.

Source candidate peer set: The source candidate peer set may include one or more source candidate peers. Original routing information that is not selected by the network device is second original routing information, and a source peer that advertises the second original routing information to the network device is the source candidate peer.

Original routing information: routing information sent by the source peer to the network device, including the routing prefix. The information may also be referred to as unprocessed routing information.

Destination peer set: The destination peer set may include one or more destination peers. A BGP session is established between the destination peer and the network device, and the destination peer may receive destination routing information sent by the network device.

Destination selected peer set: The destination selected peer set includes one or more destination selected peers. The destination selected peer is a peer to which the network device has advertised the destination routing information.

Destination candidate peer set: The candidate destination peer set includes one or more destination candidate peers. The destination candidate peer is a peer to which the network device alternatively advertises but has not advertised the destination routing information.

Destination routing information: routing information sent by the network device to the destination peer, including the routing prefix.

Figure 5:
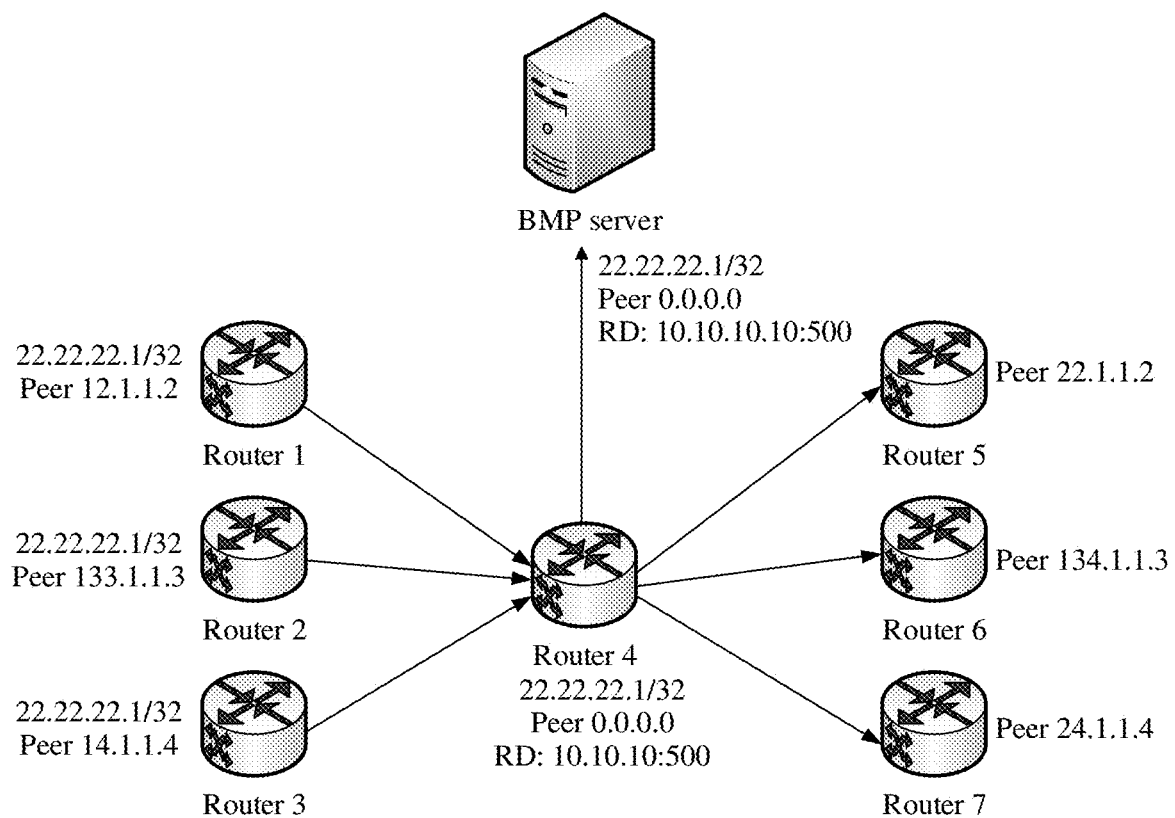
FIG. 5 is a schematic diagram of a structure of a conventional BMP architecture according to an embodiment of this application.

The following provides descriptions with reference to an example shown in FIG. 5.

FIG. 5 is a schematic diagram of a structure of a conventional BMP architecture. The BMP architecture may include one BMP server and a plurality of network devices. In the figure, the plurality of network devices are seven routers in total: a router 1, a router 2, a router 3, a router 4, a router 5, a router 6, and a router 7. The router 4 may be connected to the other routers and the BMP server through a session.

After sessions with the other routers are established, the router 4 may receive, through a BGP session, original routing information (unprocessed route message) including a routing prefix 22.22.22.1/32 advertised by each of the router 1, the router 2, and the router 3. In addition, information such as the routing prefix 22.22.22.1/32 and an IP address of the router 4 is used as local routing information, and destination routing information is sent to one or more of the router 5, the router 6, and the router 7. The destination routing information may be the same as or different from the local routing information. In some embodiments, the destination routing information may alternatively include the local routing information and attribute information of any one or more of the router 5, the router 6, and the router 7, for example, attribute information such as an AS-path value of the router 5.

In order to monitor the router 4, the local routing information reported by the router 4 to the BMP server includes information such as the routing prefix 22.22.22.32/1 and a peer address peer 0.0.0.0 of the router 4 (the peer address is set to zero according to a protocol standard). Based on the local routing information, the BMP server may determine that the router 4 receives the routing information including the routing prefix 22.22.22.1/32, but cannot determine which router or routers in the router 1, the router 2, the router 3, the router 5, the router 6 and the router 7 send or sends the routing information received by the router 4, and cannot determine that the router 4 sends the destination routing information including the routing prefix to which router or routers in the router 1, the router 2, the router 3, the router 5, the router 6, and the router 7 either. Therefore, some special network monitoring requirements cannot be met.

In addition, in an MPLS VPN application scenario, the local routing message reported by the router 4 to the BMP server in FIG. 5 may include a route distinguisher of the router 4 in a local VRF view. The route distinguisher of the router 4 in the local VRF view may be carried in a peer distinguisher field in a per-peer head field. As shown in FIG. 5, the route distinguisher of the router 4 in the local VRF view is RD: 10.10.10.10:500. Therefore, the peer distinguisher carried in a peer field in the local routing message reported by the router 4 to the BMP server is also RD: 10.10.10.10:500. As a result, the BMP server can only determine a peer from which the received local routing information including the routing prefix comes, but cannot determine a VPNv4 route from which the routing prefix is imported.

To resolve the foregoing problem, embodiments of this application provide an information reporting method, an information processing method, and a device, to add content included in a local route monitoring message, thereby meeting an increasing BMP monitoring requirement.

Figure 6:
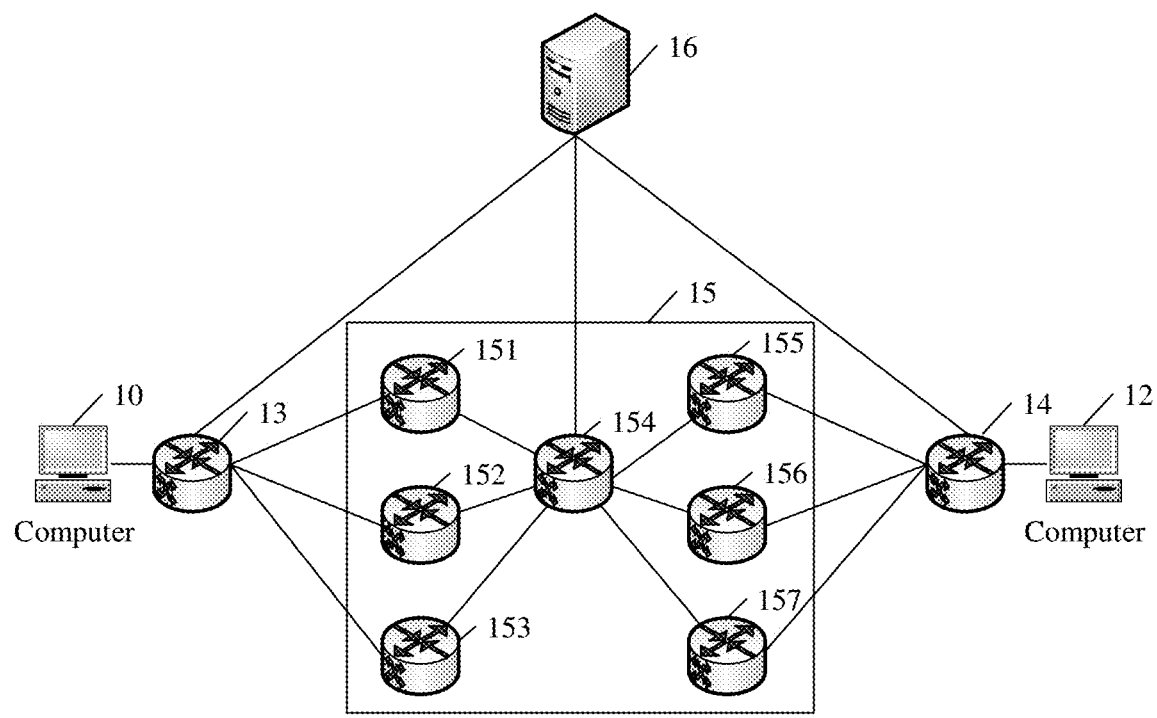
FIG. 6 is a schematic diagram of an architecture of a system 10 according to an embodiment of this application.

For ease of understanding, an application scenario in embodiments of this application is first described. Refer to FIG. 6. FIG. 6 is a schematic diagram of an architecture of a system 10 according to an embodiment of this application.

The system 10 includes a customer edge (CE) device 11, a customer edge device 12, a provider edge (PE) device 13, a provider edge device 14, a plurality of provider (P) devices 15, and a BMP server 16. For ease of description, the plurality of provider devices 15 may include seven provider devices in total: a provider device 151, a provider device 152, a provider device 153, a provider device 154, a provider device 155, a provider device 156, and a provider device 157. The customer edge device 11 is connected to the provider edge device 13, the customer edge device 12 is connected to the provider edge device 14, and the provider edge device 13 is connected to the provider edge device 14 by using the plurality of provider (P) devices 15. The BMP server 16 may be connected to any one or more devices of the provider edge device 13, the provider edge device 14, or the plurality of provider devices 15.

The customer edge device 11 and the customer edge device 12 each may be a terminal device. The terminal device is also referred to as user equipment (UE), a mobile station (MS), a mobile terminal (MT), a terminal, or the like, and is a device that provides voice and/or data connectivity for a user, or a chip disposed in the device, for example, a handheld device or a vehicle-mounted device having a wireless connection function. Currently, some examples of the terminal device are a mobile phone, a desktop computer, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a 5G-residential gateway (5G-RG) device, and the like.

The provider edge device 13, the provider edge device 14, and the plurality of provider devices 15 may be routers, switches, or the like, and are configured to transmit a message between the customer edge device 11 and the customer edge device 12. Any two devices that transfer routing messages between the provider edge device 13, the provider edge device 14, and the one or more provider devices 15 are mutually referred to as peers.

It should be noted that FIG. 6 is merely a schematic diagram of a possible architecture of the system 10 according to this embodiment of this application. Although the network devices in FIG. 6 include only seven provider devices and two provider edge devices, this does not constitute a limitation on a quantity of network devices in the system 10 provided in this embodiment of this application. In some complex network architectures, the system 10 may include hundreds or thousands of network devices with complex connections. In a simple network architecture, the system 10 may also include only two network devices that can send routing messages to each other.

Figure 7:
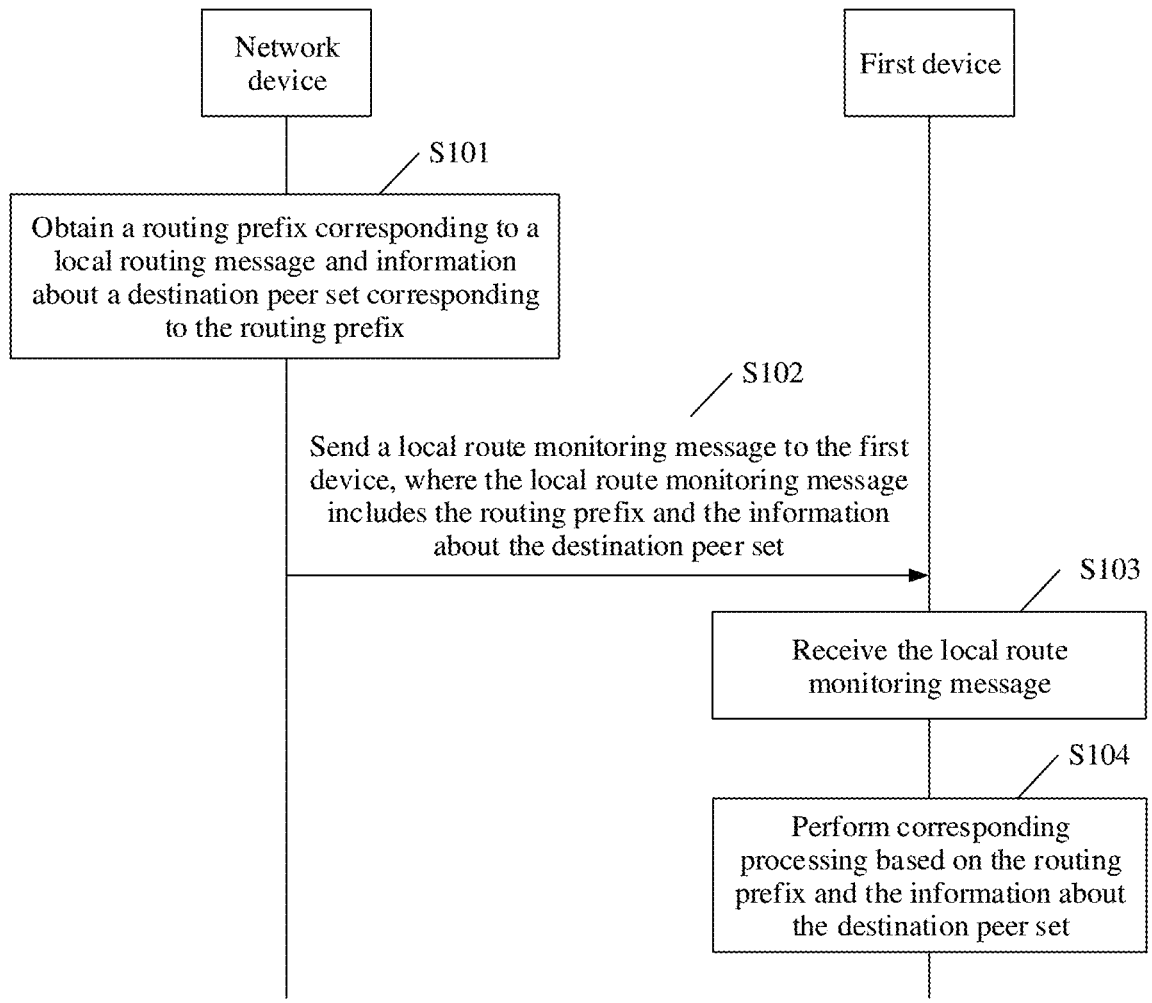
FIG. 7 is a signaling interaction diagram of a monitoring method according to an embodiment of this application.

Refer to FIG. 7. The figure is a signaling interaction diagram of a monitoring method according to an embodiment of this application. The monitoring method includes an information reporting method performed by a network device and an information processing method performed by a first device.

The monitoring method provided in this embodiment of this application may include the following steps.

S101: The network device obtains a routing prefix included in local routing information and information about a neighboring peer set corresponding to the routing prefix.

In this embodiment of this application, the network device may be any one or more of the provider edge device 13, the provider edge device 14, or the plurality of provider devices 15 in FIG. 6.

In this embodiment of this application, the neighboring peer set may include a source peer set and/or a destination peer set. The source peer set may include one or more source peers, and the destination peer may include one or more destination peers.

When communicating with another peer, the network device may receive original routing information including the routing prefix and sent by one or more peers, and then send destination routing information including the routing prefix to the one or more peers. As mentioned above, in this embodiment of this application, the peer that sends the original routing information to the network device may be referred to as the source peer, and the peer that receives the destination routing information sent by the network device may be referred to as the destination peer. The original routing information is routing information sent by the source peer to the network device, and the destination routing information is routing information sent by the network device to the destination peer. The destination routing information may be the same as or different from the local routing information. Different cases are described below by using examples. Details are not described herein again.

Figure 8:
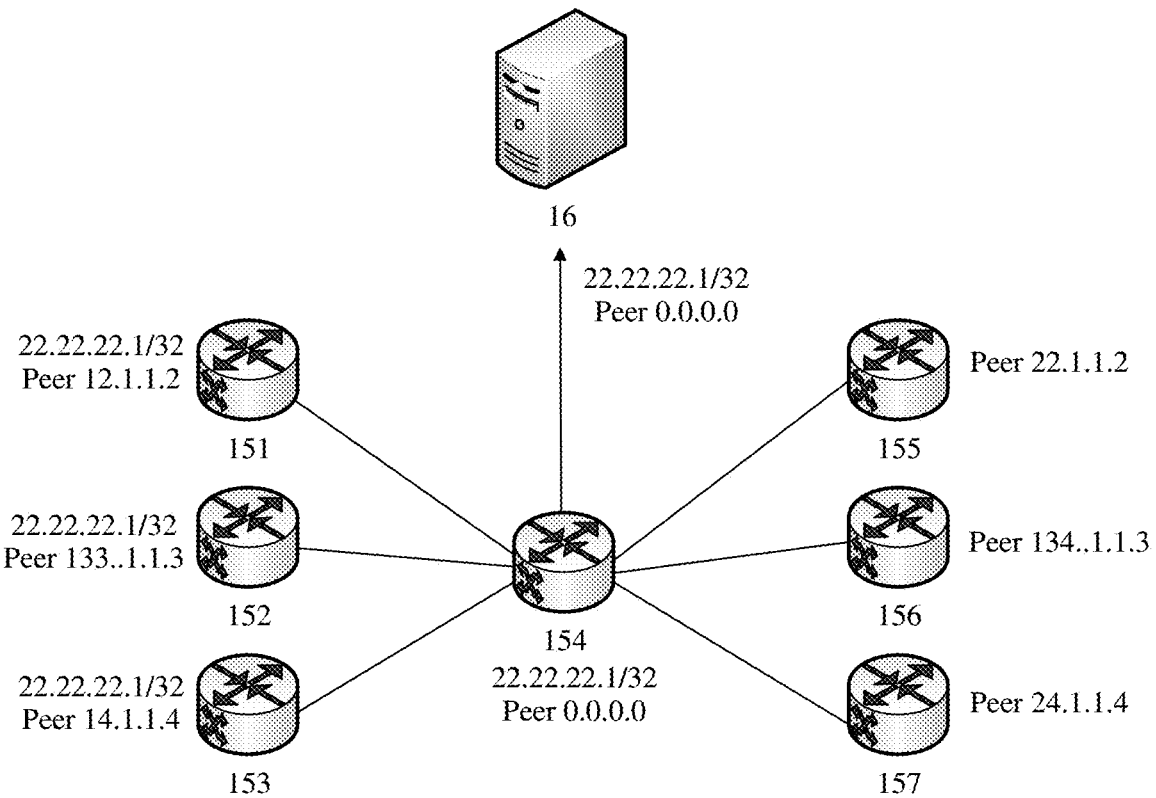
FIG. 8 is a schematic diagram of a structure of a BMP network architecture according to an embodiment of this application.

The following provides descriptions with reference to an example shown in FIG. 8. The figure is a schematic diagram of a connection between the plurality of provider devices 15 and the BMP server 16 in FIG. 6.

After establishing a session with another router, the operator device 154 may receive, through a BGP session, three pieces of original routing information that are sent by the provider device 151, the provider device 152, and the provider device 153 and that include a same routing prefix 22.22.22.1/32 and respective attribute information of the three provider devices. The provider device 154 may send information such as the routing prefix 22.22.22.1/32 and an IP address of the provider device 154 as destination routing information to any one or more of the provider device 155, the provider device 156, and the provider device 157. In this embodiment of this application, the provider device 151, the provider device 152, and the provider device 153 that can advertise the original routing information to the provider device 154 are referred to as source peers, and the provider device 155, the provider device 156, and the provider device 157 that can receive the destination routing information advertised by the provider device 154 are referred to as destination peers. The original routing information may include attribute information corresponding to the source peer, and the destination routing information may include attribute information corresponding to the destination peer. The attribute information includes, for example, one or more pieces of information such as an autonomous system path (AS-path) value and a multi exit discriminator (MED) value.

It should be noted that FIG. 8 is merely a schematic diagram of a possible connection according to this embodiment of this application. The information reporting method provided in this embodiment of this application may also be used in an application scenario in which the BGP protocol is used at any location and in any application scenario and route advertisement is performed between BGP peers. In addition, the method provided in this embodiment of this application may also be applied to an application scenario in which an interior gateway protocol (IGP) is used, for example, an application scenario in which an open shortest path first (OSPF) protocol is used or an application scenario in which an intermediate system to intermediate system (IS-IS) protocol is used.

In this embodiment of this application, after receiving a plurality of pieces of original routing information sent by the plurality of source peers, the network device may analyze attribute information such as an AS-path value and a MED value included in the plurality of pieces of original routing information, select a source peer whose original routing information meets a requirement, and determine the source peer as a source selected peer. The original routing information whose attribute information meets the requirement may be referred to as first original routing information in this embodiment of this application. For example, the network device may analyze the attribute information such as the AS-path value and the MED value included in the plurality of pieces of original routing information, and select original routing information with a smaller AS-path value and MED value as the first original routing information. Certainly, in some possible implementations, the network device may also determine the first original routing information and the source selected peer in another manner. In addition, the network device may further determine original routing information that is not selected in the received plurality pieces of original routing information as second original routing information, and determine a source peer that advertises the second original routing information as a source candidate peer.

Similarly, in this embodiment of this application, the destination peer set may include a destination selected peer set and a destination candidate peer set. The destination selected peer set may include one or more destination selected peers, and the destination candidate peer set may include one or more destination candidate peers. Before sending the destination routing information to the one or more destination peers, the network device may determine one or more destination peers in the destination peer set as the destination selected peers, and determine the remaining destination peers as the candidate destination peers. The network device may send the destination routing information only to the destination selected peer, and does not send the destination routing information to the destination candidate peer. For example, the network device may determine the destination selected peer from the destination peer set based on configuration information, and send the destination routing information to the destination selected peer. Certainly, in some special cases, the network device may also send the destination routing information to the candidate destination peer.

FIG. 8 is still used as an example. The provider device 154 may receive, through the BGP session, original routing information that includes a routing prefix and that is sent by the provider device 151, the provider device 152, and the provider device 153, and use the provider device 151, the provider device 152, and the provider device 153 as the source peers. The provider device 154 may analyze the attribute information included in the original routing information sent by the plurality of source peers, select a source peer whose original routing information meets the requirement, and determine the source peer as the source selected peer. For example, assuming that an AS-path value of the provider device 151 is 1, an AS-path value of the provider device 152 is 2, and an AS-path value of the provider device 153 is 3, the provider device 154 may select original routing information with a smallest AS-path value as the first original routing information, determine the provider device 151 as the source selected peer, and determine the provider device 152 and the provider device 153 as the source candidate peers.

In addition, the provider device 154 may further use the provider device 151, the provider device 152, and the provider device 153 as the destination peers based on configuration, and determine a destination selected peer from the provider device 155, the provider device 156, and the provider device 157. For example, the provider device 154 may determine, based on BMP server configuration, the provider device 155 and the provider device 157 as the destination selected peers, and determine the provider device 156 as the candidate destination peer. After determining the destination selected peer, the provider device 154 may send the destination routing information to the provider device 155 and the provider device 157, and temporarily does not send the destination routing information to the provider device 156. The destination routing information may include the attribute information such as the AS-path value of the destination peer. The attribute information included in the destination routing information may be consistent with the attribute information of the provider device 154, or may be attribute information modified by the provider device 154.

The neighboring peer set is described above, and the information about the neighboring peer set is described below. The information about the neighboring peer set may include information about the source peer set and information about the destination peer set. For the source peer, the network device may obtain any one or more pieces of the following information based on the original routing information or other information: an identifier of the source peer, address family information of the source peer, and distinguisher information of the source peer. For the destination peer, the network device may obtain an identifier and/or address family information of any destination peer in the destination peer set through the BGP session with the destination peer.

The identifier of the source peer may include any one or more of an IP address of the source peer, a router ID, or another device string identifier or numeric identifier that can represent the source peer, and is used to indicate a source of the routing prefix received by the network device. The address family information of the source peer is used to indicate a network of a network layer protocol applicable to the source peer, and may include an address family identifier (AFI), or may include an address family identifier and a subsequent address family identifier (SAFI). The address family identifier is used to identify an address family, and the subsequent address family identifier is used to identify a subsequent address family of the address family. For example, AFI=1 and SAFI=1 indicate an internet protocol version 4 (IPv4) unicast address family; AFI=1 and SAFI=2 indicate an IPv4 multicast address family; AFI=1 and SAFI=128 indicate a virtual private network version 4 (VPNv4) address family; and AFI=2 and SAFI=1 indicate an internet protocol version 6 (IPv6) unicast address family. The distinguisher information of the source peer may include peer distinguisher information of the source peer.

Similar to the identifier of the source peer, the identifier of the destination peer may also include any one or more of an IP address of the destination peer, a router ID, or another device string identifier or numeric identifier that can represent the destination peer, and is used to indicate a destination of the routing prefix. The address family information of the destination peer is used to indicate a network of a network layer protocol applicable to the source peer, and may include an address family identifier (AFI), or may include an address family identifier and a subsequent address family identifier (SAFI). The address family identifier is used to identify an address family, and the subsequent address family identifier is used to identify a subsequent address family of the address family.

S102: The network device sends a local route monitoring message to the first device, where the local route monitoring message includes the routing prefix and the information about the neighboring peer set.

After obtaining the routing prefix corresponding to the local routing information and the information about the neighboring peer set corresponding to the routing prefix, the network device may carry the routing prefix and the information about the neighboring peer set in the local route monitoring message for sending. Before sending the local route monitoring message to the first device, the network device may first establish a BMP session with the first device. The first device may be the BMP server 16 in FIG. 6. In addition to a server, the first device may alternatively be a terminal device, for example, a notebook computer or a desktop computer, or may be a controller, another network device, or the like. This is not specifically limited in this application.

Figure 9A:
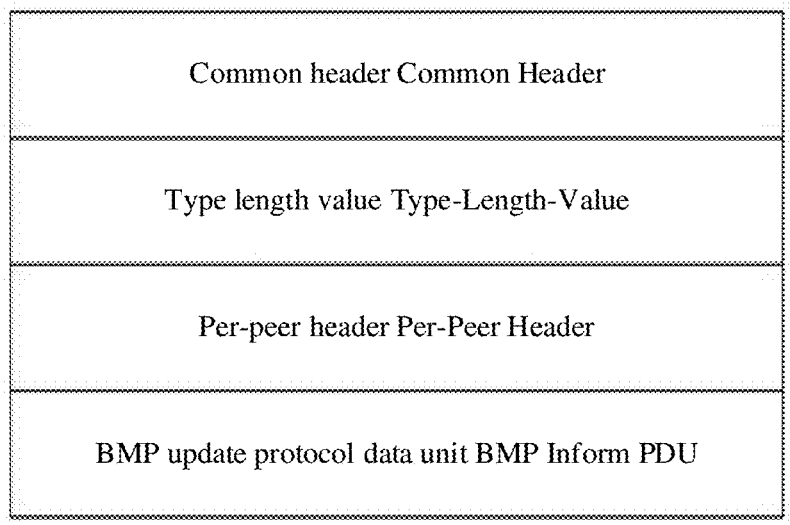
FIG. 9a is a schematic diagram of a possible format of a TLV field according to an embodiment of this application.
Figure 9B:
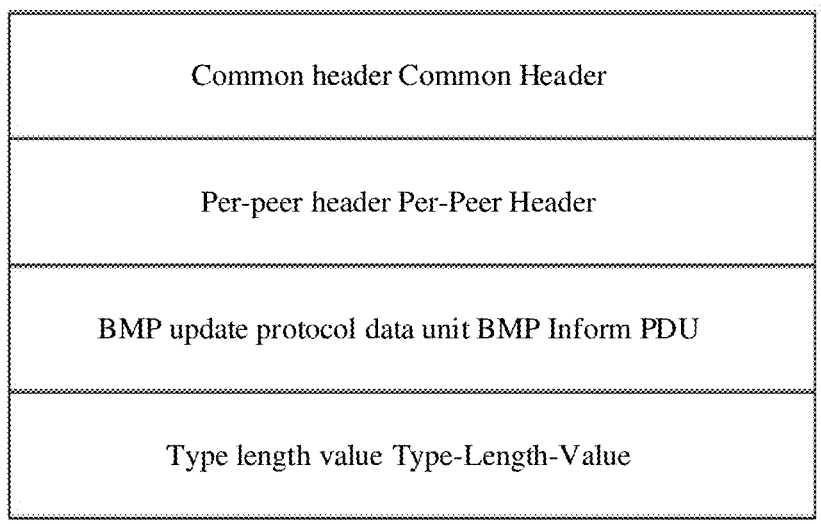
FIG. 9b is a schematic diagram of a possible format of a TLV field according to an embodiment of this application.

The local route monitoring message may be a type of RM message, and may include a pre-policy route monitoring message and a post-policy route monitoring message. A value of a peer type of the local route monitoring message is 3, indicating that the RM message is a local route monitoring message. As mentioned above, in this embodiment of this application, the local route monitoring message may include a common header field, a per-peer header field, and a BMP update PDU field. In addition, the local route monitoring message may further include a type length value (TLV) field, used to carry the information about the neighboring peer set. Refer to FIG. 9a and FIG. 9b. The TLV field may be carried between the common header field and the per-peer header field of the local route monitoring message, or may be carried after the BMP update PDU field.

In this embodiment of this application, the information about the neighboring peer set may be carried in one TLV field, or the information about the source peer set and the information about the destination peer set may be respectively carried in a first TLV field and a second TLV field. When the neighboring peer set includes only one of the source peer set and the destination peer set, the local route monitoring message may include only one of the first TLV field and the second TLV field. The first TLV field may be used to carry the information about the source peer set, and the second TLV field may be used to carry the information about the destination peer set.

Figure 10:
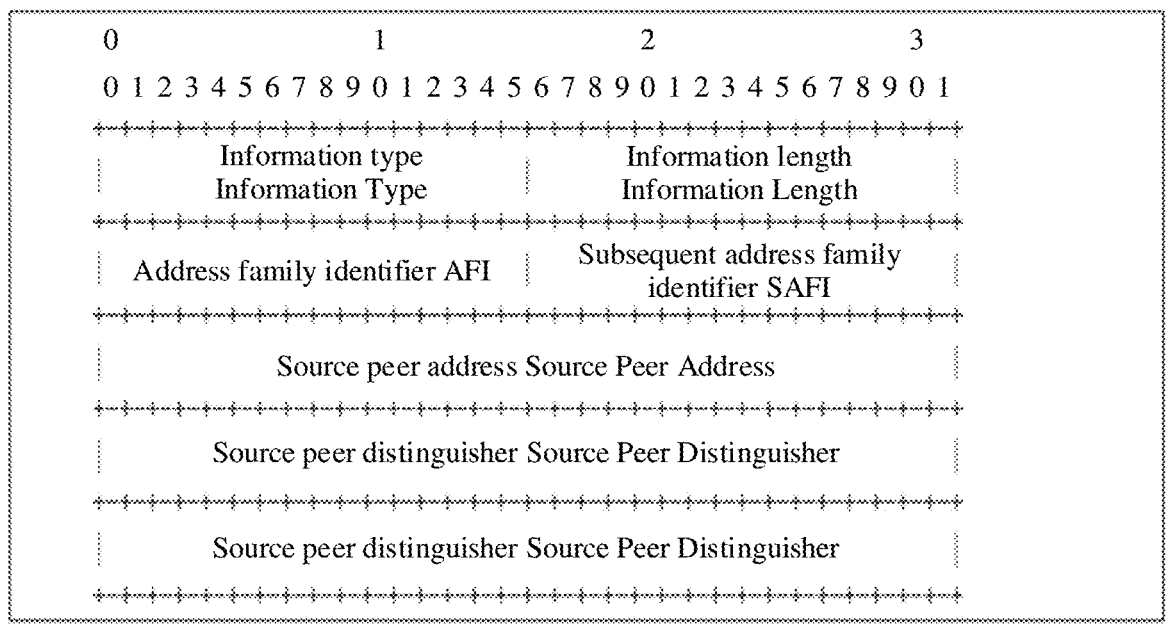
FIG. 10 is a schematic diagram of a possible format of a first TLV field according to an embodiment of this application.

Refer to FIG. 10. The figure is a schematic diagram of a possible format of the first TLV field. It can be seen from the figure that, the first TLV field may include an information type field, an information length field, an AFI field, a SAFI field, a source peer address field, and a source peer distinguisher field. A value of the information type field carries a type of the first TLV field, indicating that the first TLV field is a TLV field used to carry information about the source peer. The information length field carries a length of the first TLV field. The AFI field carries an address family identifier of the source peer. The SAFI field carries a subsequent address family identifier of the source peer. The source peer address field may carry any one or more of the IP address of the source peer, the router ID, or the another string identifier or numeric identifier that can represent the source peer. The source peer distinguisher field carries the distinguisher information of the source peer. Considering that a length of the distinguisher information of the source peer is 8 bytes, the first TLV field can contain only four bytes in one line. As shown in FIG. 10, the source peer distinguisher field may be divided into two lines for display.

Considering that the source peer set may include the plurality of source peers, the local route monitoring message reported by the network device to the first device may include a plurality of first sub-TLV fields, and each first sub-TLV field carries information about one or more source peers.

Figure 11:
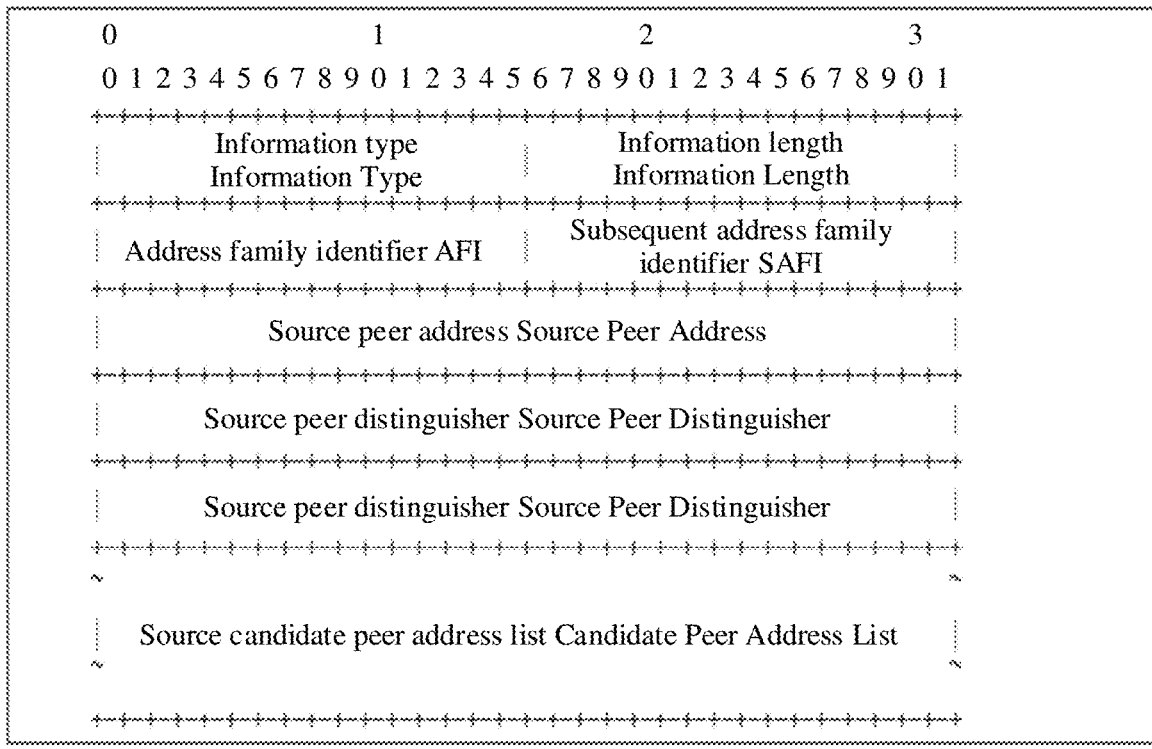
FIG. 11 is a schematic diagram of a possible format of a first TLV field according to an embodiment of this application.

Refer to FIG. 11. The figure is a schematic diagram of another possible format of the first TLV field. Considering that the source peer set may include the source selected peer set and the source candidate peer set, the first TLV field may further include a source candidate peer address list field. The candidate peer address list field may carry any one or more of IP addresses of one or more source candidate peers, router IDs, or other string identifiers or numeric identifiers that can represent the source peer. To avoid confusion caused by repeated reporting, when the first TLV field includes the candidate peer address list field, the source peer address field in the first TLV field may carry only information such as a peer address of the source selected peer.

Figure 12:
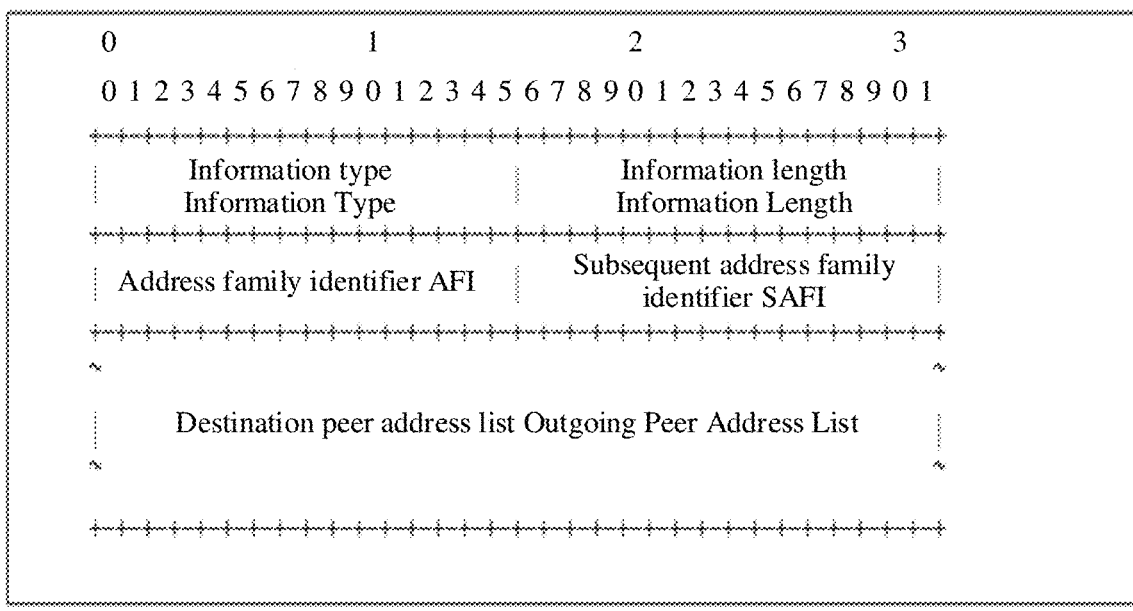
FIG. 12 is a schematic diagram of a possible format of a second TLV field according to an embodiment of this application.

Refer to FIG. 12. The figure is a schematic diagram of a possible format of the second TLV field. It can be seen from the figure that, the second TLV field may include an information type field, an information length field, an AFI field, a SAFI field, and a destination peer address list (outgoing peer address list) field. The information type field carries a type of the second TLV field, indicating that the second TLV field is a TLV field used to carry information about the destination peer. The information length field carries length information of the second TLV field. The AFI field carries an address family identifier of the destination peer. The SAFI field carries a subsequent address family identifier of the destination peer. The outgoing peer address list field may carry any one or more of IP addresses of the one or more destination peers, router IDs, or other device string identifiers or numeric identifiers that can represent the destination peer, and is used to identify the destination peer.

Considering that the network device may select the plurality of destination peers, the destination peer set may include the destination selected peer set and/or the destination candidate peer set, and the outgoing peer address list field in the second TLV field may include only peer addresses or other information of the one or more destination selected peers, or may include related information of both the destination selected peer and the destination candidate peer.

FIG. 8 is still used as an example. After obtaining the information about the neighboring peer set, the provider device 154 may report the local route monitoring message to the BMP server 16. The local route monitoring message may include the routing prefix and the first TLV field and/or the second TLV field. The first TLV field may include any one or more of an IP address 12.1.1.2 of the provider device 151, an IP address 133.1.1.3 of the provider device 152, and an IP address 14.1.1.4 of the provider device 153. The second TLV field may include any one or more of an IP address 22.1.1.2 of the provider device 155, an IP address 24.1.1.4 of the provider device 156, and an IP address 24.1.1.4 of the provider device 157. In this way, the BMP server 16 may determine, based on the local route monitoring message sent by the provider device 154, the source peer that advertises the original routing information including the routing prefix to the provider device 154 and the destination peer to which the provider device 154 advertises the destination routing information including the routing prefix. In addition, the provider device 154 may carry the IP address 133.1.1.3 of the provider device 152 and the IP address 14.1.1.4 of the provider device 153 in the candidate peer address list in the first TLV field, so that the BMP server determines, based on the local route monitoring message, that the provider device 154 uses the provider device 151 as the source selected peer, and uses the provider device 152 and the provider device 153 as the source candidate peers. Therefore, some special monitoring requirements are met.

S103: The first device receives the local route monitoring message from the network device.

S104: The first device performs corresponding processing based on the routing prefix and the information about the neighboring peer set in the local route monitoring message.

As mentioned above, the local route monitoring message sent by the network device to the first device includes the routing prefix and the information about the neighboring peer set, and the information about the neighboring peer set may include any one or more of the following items: the peer identifier of the source peer, the address family information of the source peer, the distinguisher information of the source peer, the identifier of the destination peer, and the address family information of the destination peer. After receiving the local route monitoring message, the first device may perform corresponding processing. For example, the first device may store and display the local route monitoring message, or display a connection relationship between the network device and each peer in a topology diagram, so that a network administrator can manage, evaluate, and select a route in a network based on the obtained information.

In some possible implementations, the first device or the administrator may evaluate, based on the information about the destination peer set, whether the one or more destination selected peers and destination candidate peers selected by the network device are appropriate, so that the first device generates a first control message to adjust the destination selected peer and the destination candidate destination peer. The first control message may include a first indication information and/or a second indication information. The first indication information is information obtained by the network device based on information about the destination selected peer set, and is used to indicate the network device to use the one or more destination selected peers in the destination selected peer set as the destination candidate peers. The second indication information is information obtained by the network device based on information about the destination candidate peer set, and is used to indicate the network device to use the one or more destination candidate peers in the destination candidate peer set as the destination selected peers. After receiving the first indication information, the network device may readjust the one or more destination selected peers in the destination selected peer set to the destination candidate peers. After receiving the second indication information, the network device may readjust the one or more destination candidate peers in the destination candidate peer set to the destination selected peers. In this way, the first device may control, by delivering the first indication information and/or the second indication information, the network device to advertise the destination routing information to a most appropriate destination peer based on an actual situation.

For example, the first device or the network administrator may determine peer addresses of the one or more destination selected peers of the network device based on the information about the destination selected peer set. By querying the peer addresses of the one or more destination selected peers, the first device may determine network parameters such as a network delay parameter, a network packet loss parameter, and a peer charging standard of the destination selected peer, so as to determine, based on the network parameters, whether the destination selected peer is appropriate. When the network parameters of the one or more destination selected peers are not appropriate for a current situation, the first device may generate the corresponding first indication information for indicating the network device to re-determine an inappropriate destination selected peer as the candidate destination peer. The first device may query the network parameters of the destination selected peer based on the information about the destination selected peer, and then evaluate, based on the network parameters, whether the destination selected peer is appropriate, or may perform evaluation based on other parameters configured by the administrator or directly based on the information about the destination selected peer set. This is not specifically limited in this application. After receiving the first indication information, the network device adjusts the one or more destination selected peers in the destination selected peer set to the destination candidate peers based on the first indication information.

In addition, a process in which the first device obtains the second indication information based on the information about the destination candidate peer set and a process in which the first device obtains the first indication information based on the information about the destination selected peer set are not described again in this application.

FIG. 8 is still used as an example. After receiving the local route monitoring message sent by the provider device 154, the BMP server 16 may determine that the provider device 154 sends the destination routing information to the provider device 155 and the provider device 157, and the provider device 155 and the provider device 157 are the destination selected peers. However, the provider device 156 does not receive the destination routing information sent by the provider device 154, and the provider device 156 is the destination candidate peer. In this case, the BMP server 16 may evaluate the one or more destination selected peers and destination candidate peers selected by the provider device 154 based on the information about the destination selected peer set and the information about the destination candidate peer set. In addition, the BMP server adjusts the one or more destination selected peers and destination candidate peers by sending the first control message to the provider device 154. For example, when the BMP server determines, based on the information about the neighboring peer included in the local route monitoring message, that a network between the provider device 155 and another provider device fluctuates greatly and a packet loss rate is relatively high, the BMP server 16 may send the first control message including the first indication information to the provider device 154, indicate the provider device 154 to change the provider device 155 from the destination selected peer to the destination candidate peer, and stop sending the destination routing information to the provider device 155. When the BMP server determines, based on the information about the neighboring peer set, that a network environment between the provider device 156 and another provider device is relatively good and suitable for transmitting the destination routing information, the BMP server 16 may send the first control message including the second indication information to the provider device 154, indicate the provider device 154 to change the provider device 156 from the destination candidate peer to the destination selected peer, and send the destination routing information to the provider device 156. After receiving the first control message, the provider device 154 may change the provider device 155 to the destination candidate peer and change the provider device 156 to the destination selected peer based on the first indication information and the second indication information included in the first control message.

In some possible implementations, the first device may obtain the first routing policy set based on the information about the source peer set and the routing prefix, and send the first routing policy set to the network device based on a second control message. The first routing policy set may include routing policies of the one or more source peers, and is used to adjust attribute information of the one or more source peers. The network device may re-select one or more source selected peers from the source peer set based on the adjusted attribute information of the source peer. In this way, by obtaining the first routing policy set based on the information about the source peer set and the routing prefix, the attribute information of the source peer may be adjusted, thereby adjusting the source selected peer and the source candidate peer selected by the network device. The first device may determine a network parameter of the source peer based on the information about the source peer set and the routing prefix, and obtain the first routing policy set based on the network parameter. Alternatively, the routing policy of the source peer may be obtained in another manner based on the information about the source peer set and the routing prefix, or may be directly configured by the network administrator. This is not specifically limited in this application.

After receiving the first routing policy set, the network device may adjust, based on the routing policies of the one or more source peers included in the first routing policy set, attribute information such as an AS-path value and a MED value of the one or more source peers stored in the network device, so that the network device re-selects one or more source selected peers from the one or more source peers based on the adjusted attribute information.

Figure 13:
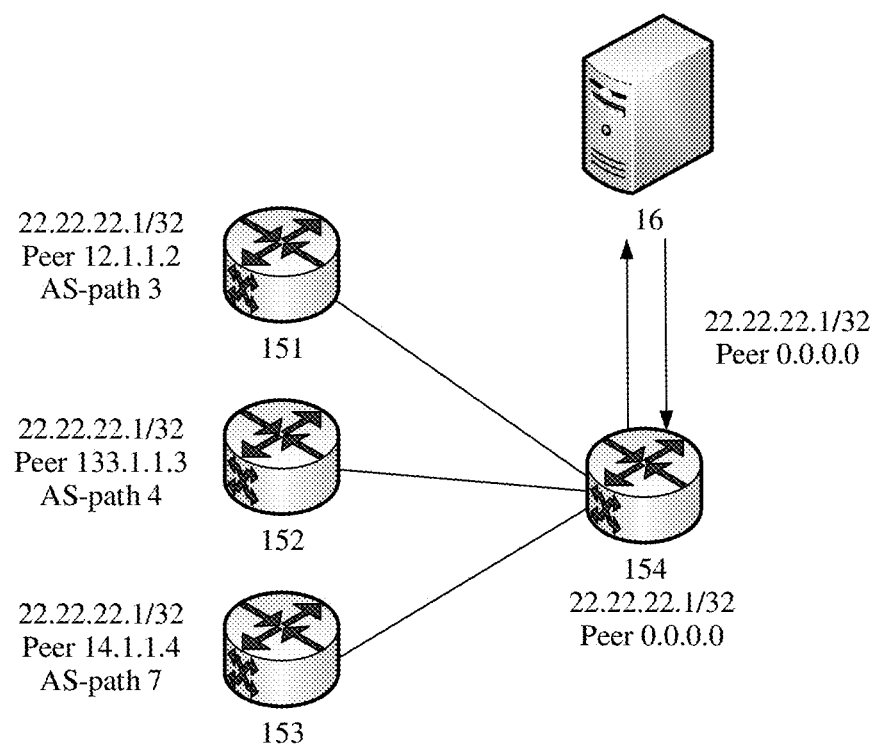
FIG. 13 is a schematic diagram of a structure of a BMP architecture according to an embodiment of this application.

FIG. 13 is a schematic diagram of a structure of a BMP architecture according to an embodiment of this application. The provider device 154 may receive, from the provider device 151, the provider device 152, and the provider device 153, the original routing information that includes the routing prefix 22.22.22.1/32. The original routing information advertised by the source peer to the network device includes AS values of the one or more source peers. A quantity of occurrences of the AS values in the original routing information is referred to as an AS-path value of the source peer corresponding to the original routing information. When selecting the source selected peer, the network device 154 may select the provider device 151 with a smallest AS-path value as the source selected peer, and use the provider device 152 and the provider device 153 each with a greater AS-path value as the source candidate peers.

After receiving the local route monitoring message sent by the network device 154, the first device BMP server 16 may determine, based on the information about the source peer set and the routing prefix included in the local route monitoring message, whether the source selected peer 151 selected by the provider device 154 is appropriate, and obtain the corresponding first routing policy set, thereby adjusting the attribute information of any one or more of the provider device 151, the provider device 152, and the provider device 153 that are stored in the network device. For example, when the first device needs to adjust the provider device 151 to the source candidate peer and adjust the provider device 152 to the source selected peer, the BMP server 16 may deliver the second control message including the first routing policy set to the provider device 154. The provider device 154 may adjust, according to the routing policies of the one or more source peers included in the first routing policy set, the AS-path value of the provider device 151 that is stored in the provider device 154 to 5. In this way, the provider device 152 is a source peer with a smallest AS-path value in the source peer set. The network device may determine the provider device 152 as the source selected peer.

The BGP network architecture usually includes a large quantity of peers. These peers have a function of both receiving the original routing information advertised by the upstream source peer set and advertising the destination routing information to the downstream destination peer set. That is, in the BGP network architecture, a destination peer of a network device may also determine new original routing information based on attribute information of the destination peer included in the destination routing information, and send the new original routing information including a routing prefix to a next-level peer.

Considering the foregoing problem, in some possible implementations, the second control message sent by the first device to the network device may further include obtaining a second routing policy set based on the information about the destination peer set and the routing prefix. The second routing policy set may include routing policies of the one or more destination peers, and is used to adjust attribute information of the one or more destination peers. After receiving the second routing policy set, the network device may adjust the attribute information of the destination peer according to the routing policy of the destination peer. In this way, when the destination peer serves as a new source peer and sends the new original routing information to another network device, attribute information included in the new original routing information is the modified attribute information of the destination peer. The network device that receives the new original routing information may select, based on the modified attribute information, the destination peer to which the new original routing information is sent. The first device may determine a network parameter of the destination peer based on the information about the destination peer set and the routing prefix, and obtain the first routing policy set based on the network parameter. Alternatively, the first routing policy may be obtained in another manner based on the information about the destination peer set and the routing prefix, or may be directly configured by the network administrator. This is not specifically limited in this application.

Figure 14:
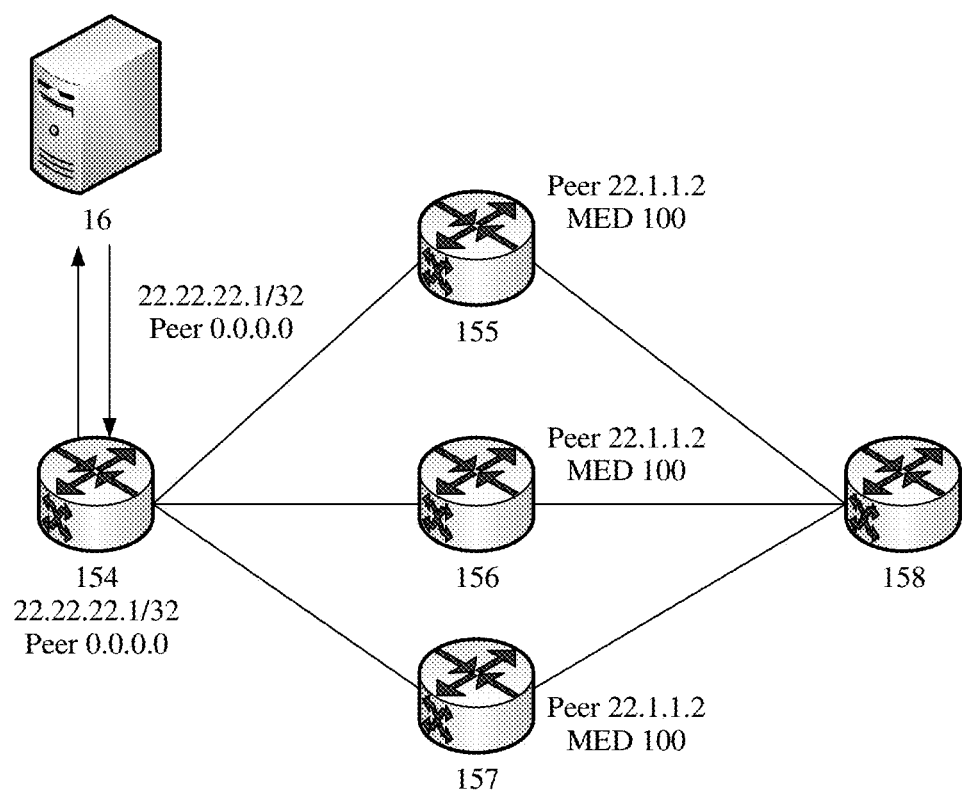
FIG. 14 is a schematic diagram of a structure of a BMP architecture according to an embodiment of this application.

FIG. 14 is a schematic diagram of a structure of a BMP architecture according to an embodiment of this application. The provider device 154 may advertise the destination routing information including the routing prefix 22.22.22.1/32 to the provider device 155, the provider device 156, and the provider device 157, and send the local route monitoring message to the BMP server 16. A MED value of the provider device 155 is 50, and MED values of the provider device 156 and the provider device 157 are both 100. After receiving the destination routing information sent by the provider device 154, the provider device 155, the provider device 156, and the provider device 157 may serve as new source peers, and send, to a provider device 158, the destination routing information including the routing prefix 22.22.22.1/32 and respective attribute information as the original routing information. The provider device 158 may select the source selected peer from the provider device 155, the provider device 156, and the provider device 157 according to the received original routing information. For example, the provider device may select the provider device 155 with the smallest MED value as the source selected peer.

The provider device 154 may receive the second control message that includes the second routing policy set and that is sent by the BMP server. The provider device 154 may send the destination routing information to the provider device 155, the provider device 156, and the provider device 157 according to the second routing policy set, thereby adjusting the attribute information of any one or more of the provider device 155, the provider device 156, and the provider device 157. The provider device 155, the provider device 156, and the provider device 157 may update locally stored attribute information to the adjusted attribute information, and send the adjusted attribute information to the provider device 158 based on the new original routing information, so that the provider device 158 randomly selects one or more of the provider device 155, the provider device 156, and the provider device 157 as the source selected peer according to the adjusted routing information.

For example, when the network administrator needs a data stream whose routing prefix is 22.22.22.1/32 to be sent from the provider device 154 to the provider device 158 by using the provider device 157, the provider device 158 may select the provider device 157 from the provider device 155, the provider device 156, and the provider device 157 as the source selected peer of the provider device 158. In this case, the BMP server 16 may send the second control message including the second routing policy set to the provider device 154, so as to control the provider device 154 to adjust the attribute information of any one or more of the provider device 155, the provider device 156, and the provider device 157. The provider device 154 may adjust the MED value of the provider device 155 to 150 and adjust the MED value of the provider device 157 to 50 according to the routing policies of the one or more destination peers included in the second routing policy set, and sends the adjusted values to the provider device 155 and the provider device 157 based on the destination routing information. In this way, when the provider device 155, the provider device 156, and the provider device 157 serve as the source peers to send the original routing information including the routing prefix 22.22.22.1/32 to the provider device 158, the MED value in the original routing information sent by the provider device 155 to the provider device 158 is 150, the MED value in the original routing information sent by the provider device 156 to the provider device 158 is 100, and the MED value in the original routing information sent by the provider device 157 to the provider device 158 is 50. The provider device 158 may select, from the provider device 155, the provider device 156, and the provider device 157, the operator device 157 with the smallest MED value as the source selected peer, and use the provider device 157 and the operator device 157 as the source candidate peers. In this way, by sending the second routing set policy to the network device, the attribute information of the destination peer may be adjusted, so as to adjust subsequent peer routing, thereby implementing an objective of controlling a network traffic direction.

To implement the special network monitoring requirement, the first device may also generate and store a correspondence between the routing prefix and the neighboring peer set. For example, to monitor a direction of the routing prefix, the first device may generate a correspondence between the routing prefix, an identifier of the source selected peer, and an identifier of the destination selected peer. In this way, based on the correspondence between the routing prefix and the identifier of the source selected peer, the source selected peer and the destination selected peer that the routing prefix passes through may be determined, so as to determine a source and a destination of the routing prefix, and implement monitoring of a direction of the routing prefix.

The following uses a specific VPN application scenario as an example for description.

Figure 15:
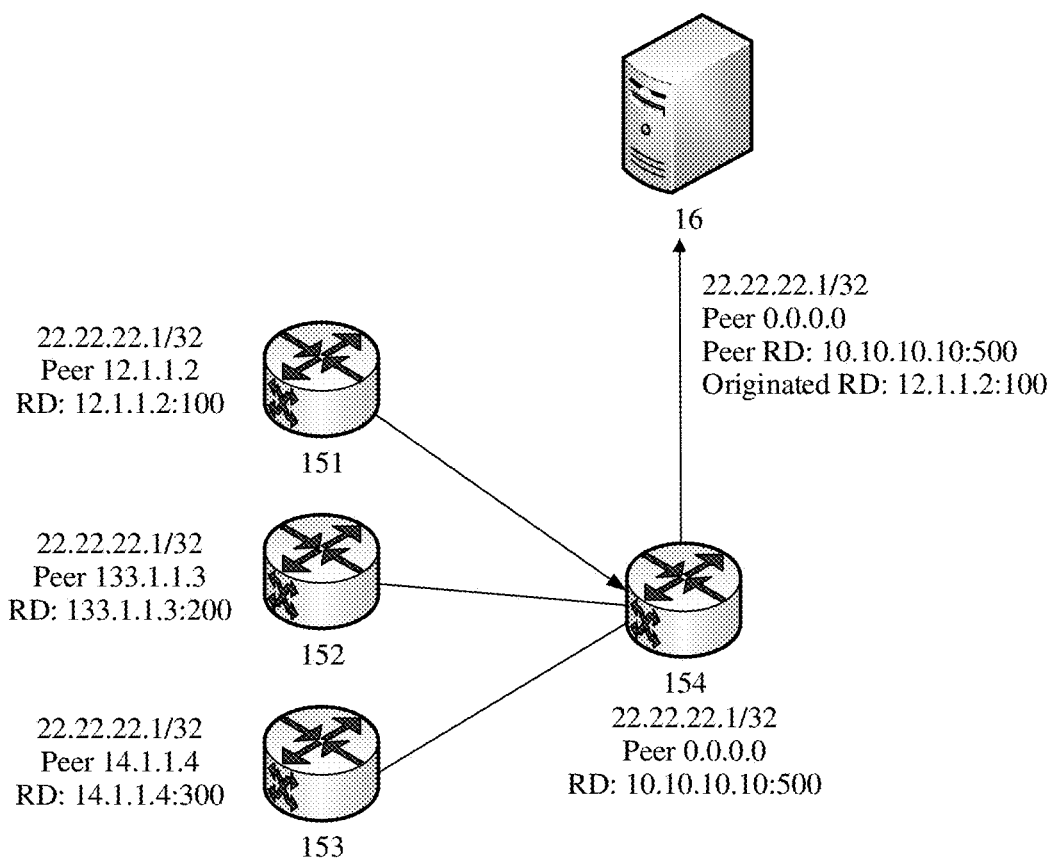
FIG. 15 is a schematic diagram of a structure of a BMP architecture in a VPN scenario according to an embodiment of this application.

FIG. 15 is a schematic diagram of a structure of a BMP architecture in a VPN scenario according to an embodiment of this application. In the scenario shown in FIG. 15, the provider device 154 may receive the original routing information that includes the routing prefix 22.22.22.1/32 and that is advertised by the provider device 151, the provider device 152, and the provider device 153.

In the VPN scenario, the original routing information may further include a route distinguisher message of the source peer. The original routing message received by the provider device 154 may be shown in the following table.

| Source peer | VPNv4 prefix | Peer IP address | Route distinguisher |
|---|---|---|---|
| Provider device 151 | 12.1.1.2:100 22.22.22.1/32 | 12.1.1.2 | 12.1.1.2:100 |
| Provider device 152 | 133.1.1.3:200 22.22.22.1/32 | 133.1.1.3 | 133.1.1.3:200 |
| Provider device 153 | 14.1.1.4:300 22.22.22.1/32 | 14.1.1.4 | 14.1.1.4:300 |

Each row in this table is related information carried in the original routing information sent by the source peer. In addition to the routing prefix 22.22.22.1/32, the original routing information may further include information such as peer address information, VPNv4 prefix information, and peer distinguisher information of the source peer. The VPNv4 prefix may include the routing prefix sent by the source peer and an RD of the source peer. The peer distinguisher information may be a route distinguisher of the source peer in a local VRF view of the provider device 154.

After receiving the routing prefix and the original routing message, the provider device 154 may select one or more of the provider device 151, the provider device 152, and the provider device 153 as the source selected peer based on the original routing message, and reports the local route monitoring message including the route distinguisher of the source selected peer to the BMP server.

For example, the provider device 154 may select the provider device 151 as the source selected peer. In this case, the local route monitoring message reported by the provider device 154 to the BMP server 16 includes the routing prefix 22.22.22.1/32, a peer address peer 0.0.0.0 of the provider device 154, and the route distinguisher peer RD:10.10.10.10:500 of the provider device 154 in the local VRF view, the local route monitoring message may further include an original route distinguisher Originated RD: 12.1.1.2:100 of the provider device 151 in the local VRF view of the provider device 154. In this way, the BMP server may determine, based on the local route monitoring message reported by the provider device 154, that the routing prefix 22.22.22.1/32 included in the local route monitoring message is from the provider device 151 whose route distinguisher is 12.1.1.2:100.

When the source selected peer and/or the source candidate peer of the provider device 154 need/needs to be adjusted, the BMP server 16 may also deliver the second control message including the routing policy of the source peer, and a source of traffic entering the provider device 154 is adjusted by changing attribute information of the source peer of the provider device 154.

For example, the provider device 151 is adjusted to the source candidate peer, and the provider device 153 is adjusted to the source selected peer. The BMP server 16 may deliver the second control message including the second routing policy set to the provider device 154. The second routing policy set may include routing policies of the provider device 151, the provider device 152, and the provider device 153. The provider device 154 may adjust the attribute information of each provider device according to the routing policy of each provider device. For example, a BGP local-preference of the provider device 151 may be adjusted to 50, a BGP local-preference of the provider device 152 may be adjusted to 100, and a BGP local-preference of the provider device 153 may be adjusted to 150. In this way, when selecting the source selected peer, the provider device 154 may select the provider device 153 with the highest BGP local-preference as the source selected peer.

Figure 16:
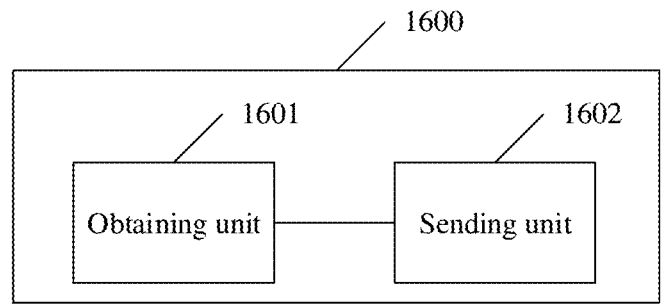
FIG. 16 is a schematic diagram of a structure of an information reporting apparatus 1600 according to an embodiment of this application.

Correspondingly, refer to FIG. 16. An embodiment of this application further provides an information reporting apparatus 1600. The apparatus 1600 is applied to a network device. The network device may perform step S101 and step S102 in the embodiment shown in FIG. 7. The apparatus 1600 includes an obtaining unit 1601 and a sending unit 1602. The obtaining unit 1601 is configured to perform step S101 in the embodiment shown in FIG. 7, and the sending unit 1602 is configured to perform step S102 in the embodiment shown in FIG. 7.

For example, the obtaining unit 1601 is configured to obtain a routing prefix included in local routing information and information about a neighboring peer set corresponding to the routing prefix. The neighboring peer set includes a source peer set and/or a destination peer set, the source peer set includes one or more source peers, the source peer is a peer that advertises original routing information including the routing prefix to the network device, the destination peer set includes one or more destination peers, and the destination peer is a peer to which the network device advertises destination routing information including the routing prefix. The sending unit 1602 is configured to send a local route monitoring message to a first device. The local route monitoring message includes the routing prefix and the information about the neighboring peer set.

In addition, the information reporting apparatus may further include a first receiving unit and/or a second receiving unit. The first receiving unit and the second receiving unit may be a same unit or different units. The first receiving unit may be configured to receive a first control message from the first device, and the second receiving unit may be configured to receive a second control message from the first device. The first control message includes first indication information and/or second indication information, the first indication information is used to indicate to determine one or more destination selected peers in a destination selected peer set as destination candidate peers, and the second indication information is used to indicate the network device to determine one or more destination candidate peers in a destination candidate peer set as destination selected peers. The second control message includes a first routing policy set and/or a second routing policy set. The first routing policy set includes routing policies of the one or more source peers. The routing policy of the source peer is used to adjust attribute information of the source peer. The second routing policy set includes routing policies of the one or more destination peers. The routing policy of the destination peer is used to adjust attribute information of the destination peer.

For other content of the information reporting apparatus 1600, refer to the foregoing descriptions. Details are not described herein again.

Figure 17:
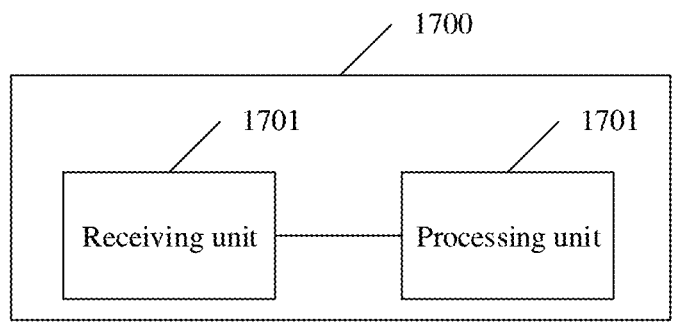
FIG. 17 is a schematic diagram of a structure of an information processing apparatus 1700 according to an embodiment of this application.

Refer to FIG. 17. An embodiment of this application further provides an information processing apparatus 1700. The apparatus 1700 is applied to a first device, and the network device may perform step S103 and step S104 in the embodiment shown in FIG. 7. The apparatus 1700 includes a receiving unit 1701 and a processing unit 1702. The receiving unit 1701 is configured to perform step S103 in the embodiment shown in FIG. 7, and the processing unit 1702 is configured to perform step S104 in the embodiment shown in FIG. 7.

For example, the receiving unit 1701 is configured to receive a local route monitoring message sent by a network device. The local route monitoring message includes a routing prefix included in local routing information of the network device and information about a neighboring peer set corresponding to the routing prefix, the neighboring peer set includes a source peer set and/or a destination peer set, the source peer set includes one or more source peers, the source peer is a peer that advertises original routing information corresponding to the routing prefix to the network device, the destination peer set includes one or more destination peers, and the destination peer is a peer to which the network device advertises destination routing information. The processing unit 1702 is configured to perform corresponding processing based on the routing prefix and the information about the neighboring peer set.

In addition, the information processing apparatus may further include a first information generation unit and/or a second information generation unit 1704. The first information generation unit and the second information generation unit may be a same unit or different units. The first information generation unit is configured to: obtain first indication information based on the routing prefix and information about a destination selected peer set; and/or obtain second indication information based on the routing prefix and information about a destination candidate peer set. The second information generation unit is configured to: obtain a first routing policy set based on the routing prefix and information about the source peer set; and/or obtain second routing policy set based on the routing prefix and information about the destination peer set.

For other content of the information processing apparatus 1700, refer to the foregoing descriptions. Details are not described herein again.

Figure 18:
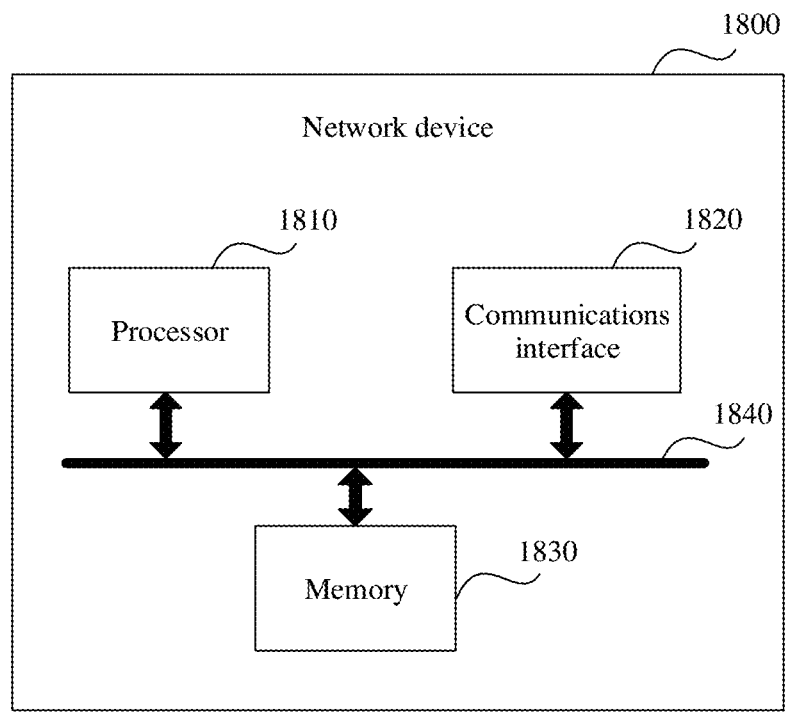
FIG. 18 is a schematic diagram of a structure of a network device 1800 according to an embodiment of this application.

Refer to FIG. 18. An embodiment of this application further provides a network device 1800. The network device 1800 includes at least one processor 1802 and at least one communications interface 1803. Further, the network device may include at least one memory 1801. The memory 1801 is configured to store a computer program or instructions. The memory 1801 may be a memory inside the processor, or may be a memory outside the processor. When the embodiment shown in FIG. 16 is implemented and the units described in the embodiment in FIG. 16 are implemented by software, software or program code required for performing functions of the processing unit 1601 and the sending unit 1602 in FIG. 16 is stored in the memory 1801. The processor 1802 is configured to execute the instructions in the memory 1801, so that the network device 1800 performs the method shown in step S101 and step S102 applied to the embodiment shown in FIG. 7. The communications interface 1803 is configured to communicate with another network device.

The memory 1801, the processor 1802, and the communications interface 1803 are connected to each other through a bus 1804. The bus 1804 may be a peripheral component interconnect (PCI) bus, an extended industry standard architecture (EISA) bus, or the like. The bus may be classified into an address bus, a data bus, a control bus, and the like. For ease of representation, only one bold line is used to represent the bus in FIG. 18, but this does not mean that there is only one bus or only one type of bus.

In a specific embodiment, the processor 1801 is configured to obtain a routing prefix included in local routing information and information about a neighboring peer set corresponding to the routing prefix, and send a local route monitoring message to a first device. The neighboring peer set includes a source peer set and/or a destination peer set, the source peer set includes one or more source peers, the source peer is a peer that advertises original routing information including the routing prefix to the network device, the destination peer set includes one or more destination peers, and the destination peer is a peer to which the network device advertises destination routing information including the routing prefix. The local route monitoring message includes the routing prefix and the information about the neighboring peer set. For a detailed processing process of the processor 1801, refer to the detailed descriptions of step S101 and step S102 in the embodiment shown in FIG. 7. Details are not described herein again.

The communications interface 1803 is configured to interact with a neighboring peer or the first device. For a specific process, refer to the detailed descriptions of the embodiment shown in FIG. 7. Details are not described herein again.

The memory 1801 may be a random access memory (RAM), a flash, a read-only memory (ROM), an erasable programmable read-only memory (EPROM), an electrically erasable programmable read-only memory (EEPROM), a register, a hard disk, a removable hard disk, a CD-ROM, or any other form of storage medium known to persons skilled in the art.

The processor 1802 may be, for example, a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The communications interface 1803 may be, for example, an interface card, or may be an Ethernet interface or an asynchronous transfer mode (ATM) interface.

Figure 19:
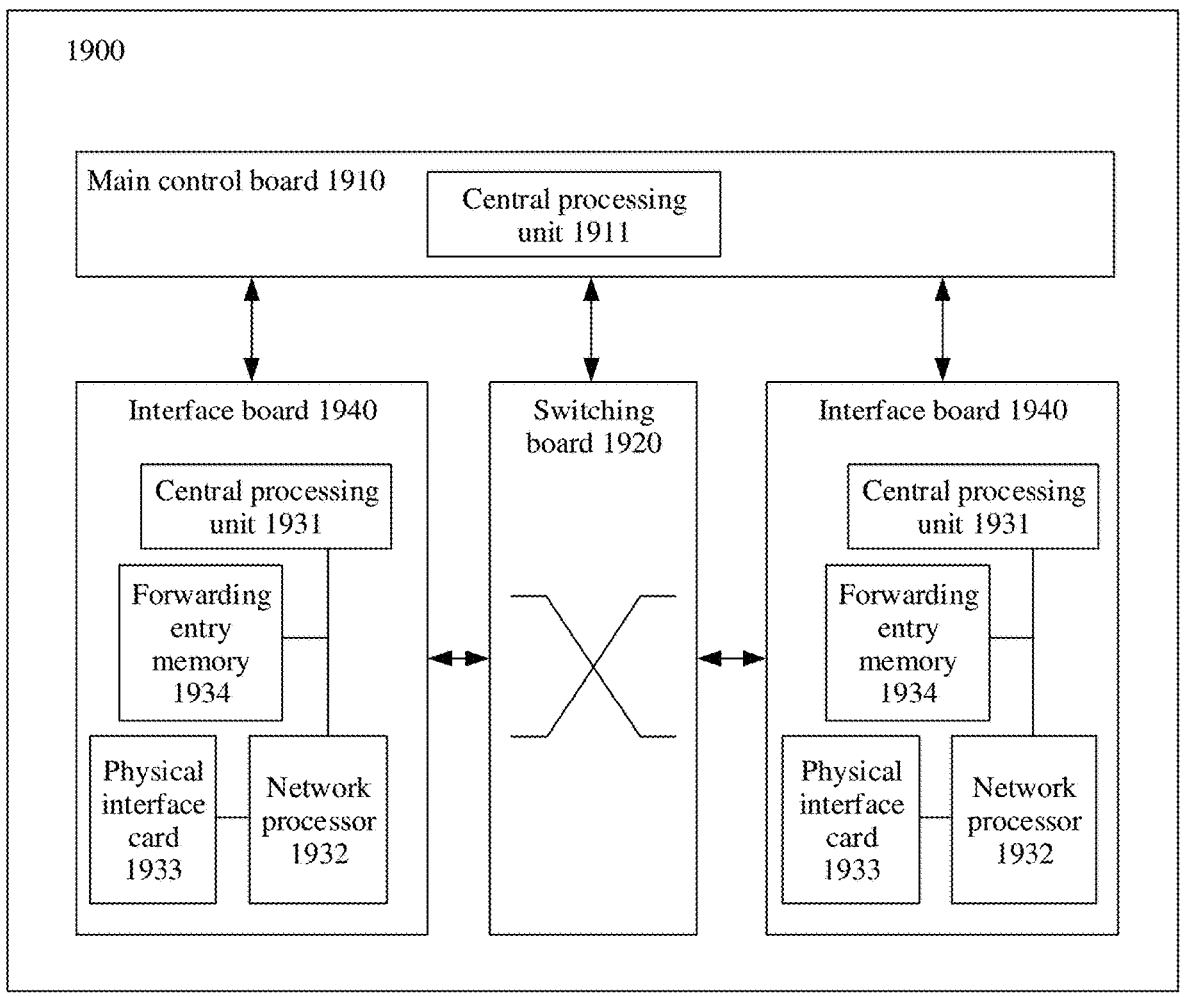
FIG. 19 is a schematic diagram of a structure of a network device 1900 according to an embodiment of this application.

FIG. 19 is a schematic diagram of a structure of a network device 1900 according to an embodiment of this application. The network device shown in the embodiment in FIG. 7 may be implemented by using the device shown in FIG. 19. Refer to the schematic diagram of the structure of the device shown in FIG. 19. The device 1900 includes a main control board and one or more interface boards. The main control board is communicatively connected to the interface boards. The main control board is also referred to as a main processing unit (MPU) or a route processor card. The main control board is responsible for controlling and managing each component in the device 900, including route computation, device management, and function maintenance. The interface board is also referred to as a line processing unit (LPU) or a line card, and is configured to forward data. In some embodiments, the device 1900 may also include a switching board. The switching board is communicatively connected to the main control board and the interface board. The switching board is configured to forward data between the interface boards. The switching board may also be referred to as a switch fabric unit (SFU). The interface board includes a central processing unit, a memory, a forwarding chip, and a physical interface card (PIC). The central processing unit is communicatively connected to the memory, a network processor, and the physical interface card. The memory is configured to store a forwarding table. The forwarding chip is configured to forward a received data packet based on the forwarding table stored in the memory. If a destination address of the data packet is an address of the device 1900, the data packet is sent to the central processing unit (CPU), for example, a central processing unit 1931, for processing. If the destination address of the data packet is not the address of the device 1900, a next hop and an outbound interface that correspond to the destination address are found in the forwarding table based on the destination address, and the data packet is forwarded to the outbound interface corresponding to the destination address. The forwarding chip may be a network processor (NP). The PIC, also referred to as a subcard, can be installed on the interface board. The PIC is responsible for converting an optical or electrical signal to a data packet, checking validity of the data packet, and forwarding the data packet to the forwarding chip for processing. In some embodiments, the central processing unit may also perform a function of the forwarding chip, for example, implement software forwarding based on a general-purpose CPU, so that the interface board does not need the forwarding chip. A communication connection between the main control board, the interface board, and the switching board may be implemented through a bus. In some embodiments, the forwarding chip may be implemented by using an application-specific integrated circuit (ASIC) or a field programmable gate array (FPGA).

Logically, the device 1900 includes a control plane and a forwarding plane. The control plane includes the main control board and the central processing unit. The forwarding plane includes components for performing forwarding, for example, the memory, the PIC, and the NP. The control plane performs functions such as a function of a router, generating the forwarding table, processing signaling and protocol packets, and configuring and maintaining a status of a device. The control plane delivers the generated forwarding table to the forwarding plane. On the forwarding plane, the NP searches a table based on the forwarding table delivered by the control plane, to forward a packet received by the PIC of the device 1900. The forwarding table delivered by the control plane may be stored in the memory. In some embodiments, the control plane and the forwarding plane may be totally separated, and are not on a same device. The following briefly describes the foregoing process with reference to the embodiment in FIG. 7.

As shown in the method shown in FIG. 7, the network device may receive, by using a physical interface card 1933, one or more pieces of original routing information sent by the one or more source peers, and send the one or more pieces of original routing information to the CPU 1931 for processing. The CPU 1931 may determine the one or more source selected peers based on the one or more pieces of original routing information, and obtain related information of the source peer, so as to send the local route monitoring message to the first device.

The network device provided in this embodiment of the present invention may correspond to the network device in the method embodiment in FIG. 7, and may implement functions of the network device and/or various steps and methods implemented by the network device in the foregoing method embodiments. The foregoing is merely a brief example description. For brevity, details are not described herein again.

It should be noted that, there may be one or more main control boards, and when there are a plurality of main control boards, the main control boards may include an active main control board and a standby main control board. There may be one or more interface boards, and a network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, a data access and processing capability of the network device in the distributed architecture is better than that of the device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined to form one central processing unit on the card, to perform functions obtained by combining the two central processing units. This form of device (for example, a network device such as a low-end switch or a router) has a relatively weak data exchange and processing capability. A specific architecture that is to be used depends on a specific networking deployment scenario. This is not limited herein.

Figure 20:
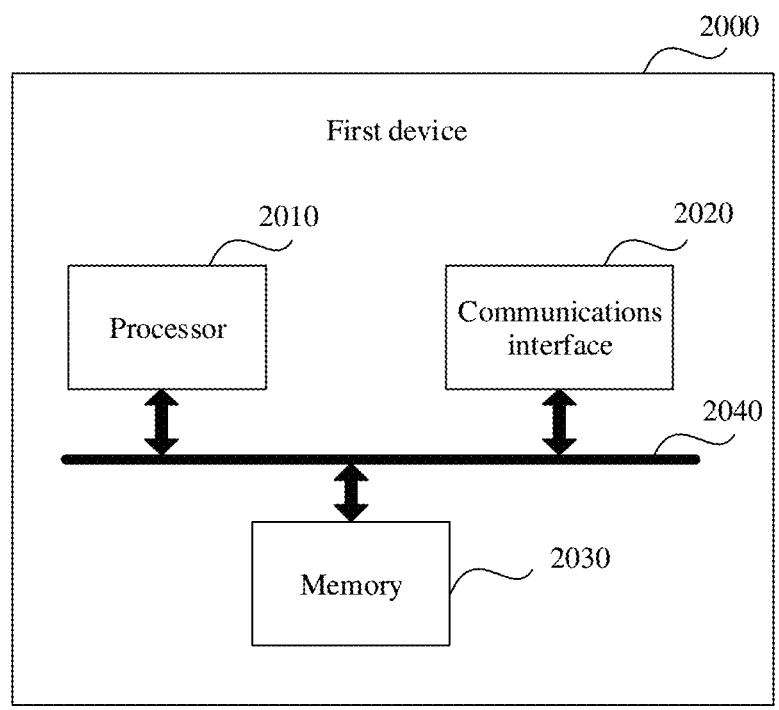
FIG. 20 is a schematic diagram of a structure of a first device 2000 according to an embodiment of this application.

Refer to FIG. 20. An embodiment of this application further provides a first device 2000. The first device 2000 includes at least one processor 2002 and at least one communications interface 2003. Further, the first device may include at least one memory 2001. The memory 2001 is configured to store a computer program or instructions. The memory 2001 may be a memory inside the processor, or may be a memory outside the processor. When the embodiment shown in FIG. 17 is implemented and the units described in the embodiment in FIG. 17 are implemented by software, software or program code required for performing functions of the receiving unit 1701 and the sending unit 1702 in FIG. 17 is stored in the memory 2001. The processor 2002 is configured to execute the instructions in the memory 2001, so that the network device 2000 performs the method shown in step S103 and step S105 applied to the embodiment shown in FIG. 7. The communications interface 2003 is configured to communicate with another network device.

The memory 2001, the processor 2002, and the communications interface 2003 are interconnected to each other through a bus 2004. The bus 2004 may be a PCI bus, an EISA bus, or the like. The bus may be classified into an address bus, a data bus, a control bus, and the like. For ease of representation, only one bold line is used to represent the bus in FIG. 8, but this does not mean that there is only one bus or only one type of bus.

In a specific embodiment, the processor 2001 is configured to receive a local route monitoring message sent by a network device, and perform corresponding processing based on a routing prefix and information about a neighboring peer set. The local route monitoring message includes the routing prefix included in local routing information of the network device and the information about the neighboring peer set corresponding to the routing prefix, the neighboring peer set includes a source peer set and/or a destination peer set, the source peer set includes one or more source peers, the source peer is a peer that advertises original routing information including the routing prefix to the network device, the destination peer set includes one or more destination peers, and the destination peer is a peer to which the network device advertises destination routing information including the routing prefix. For a detailed processing process of the processor 2001, refer to the detailed descriptions of step S103 and step S104 in the embodiment shown in FIG. 7. Details are not described herein again.

The communications interface 2003 is configured to interact with the network device. For a specific process, refer to the detailed descriptions of the embodiment shown in FIG. 7. Details are not described herein again.

The memory 2001 may be a random access memory, a flash, a read-only memory, an erasable programmable read-only memory, an electrically erasable programmable read-only memory, a register, a hard disk, a removable hard disk, a CD-ROM, or any other form of storage medium known to persons skilled in the art.

The processor 2002 may be, for example, a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The communications interface 2003 may be, for example, an interface card, or may be an Ethernet interface or an asynchronous transfer mode interface.

Figure 21:
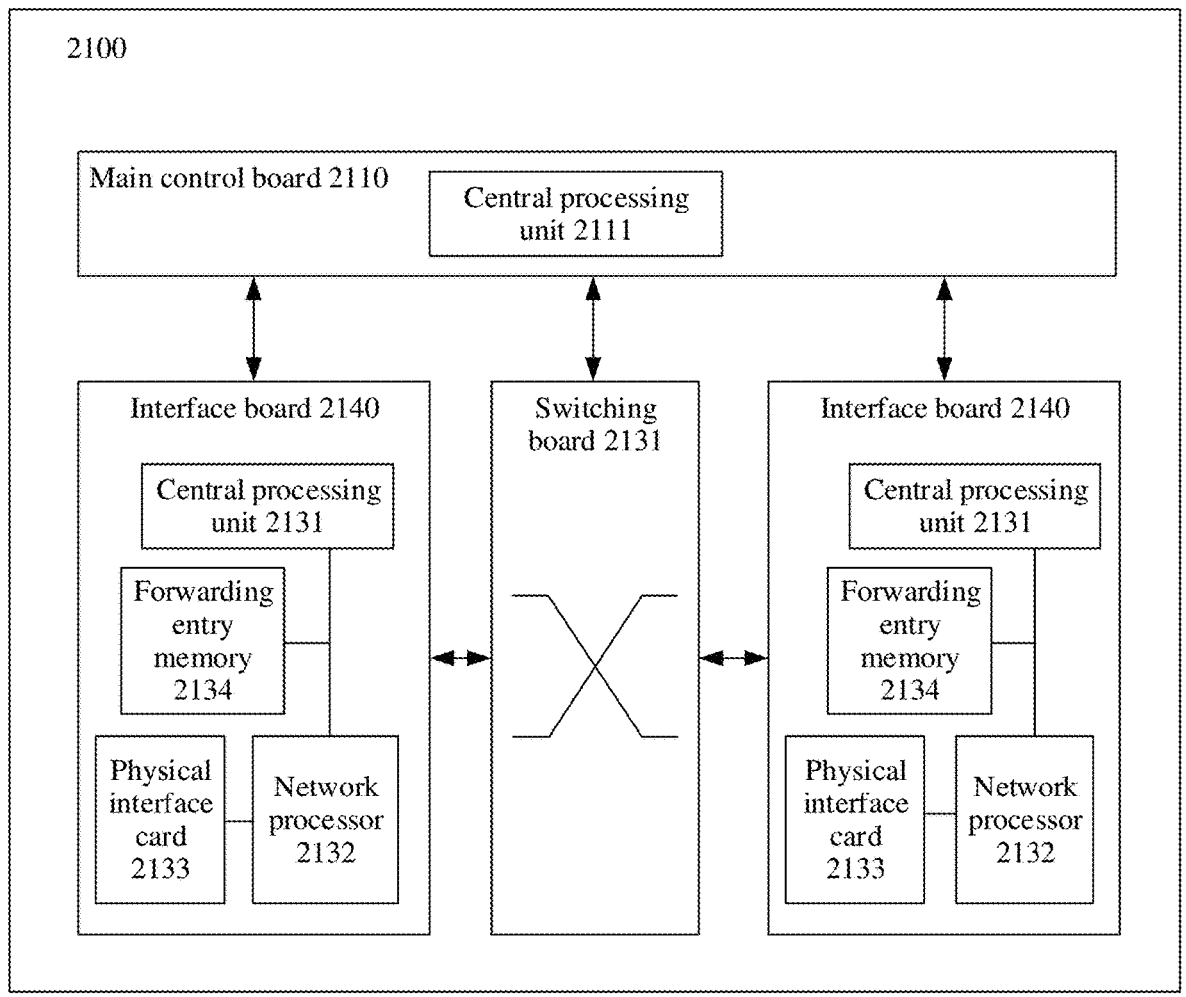
FIG. 21 is a schematic diagram of a structure of a first device 2100 according to an embodiment of this application.

FIG. 21 is a schematic diagram of a structure of a first device 2100 according to an embodiment of this application. The first device shown in the embodiment in FIG. 7 may be implemented by using the device shown in FIG. 21. Refer to the schematic diagram of the structure of the device shown in FIG. 21. The device 2100 includes a main control board and one or more interface boards. The main control board is communicatively connected to the interface boards. The main control board is also referred to as a main processing unit or a route processor card. The main control board is responsible for controlling and managing each component in the device 900, including route computation, device management, and function maintenance. The interface board is also referred to as a line processing unit or a line card, and is configured to forward data. In some embodiments, the device 2100 may also include a switching board. The switching board is communicatively connected to the main control board and the interface board. The switching board is configured to forward data between the interface boards. The switching board may also be referred to as a switch fabric unit. The interface board includes a central processing unit, a memory, a forwarding chip, and a physical interface card. The central processing unit is communicatively connected to the memory, a network processor, and the physical interface card. The memory is configured to store a forwarding table. The forwarding chip is configured to forward a received data packet based on the forwarding table stored in the memory. If a destination address of the data packet is an address of the device 2100, the data packet is sent to the central processing unit, for example, a central processing unit 2131, for processing. If the destination address of the data packet is not the address of the device 2100, a next hop and an outbound interface that correspond to the destination address are found in the forwarding table based on the destination address, and the data packet is forwarded to the outbound interface corresponding to the destination address. The forwarding chip may be a network processor (NP). The PIC, also referred to as a subcard, can be installed on the interface board. The PIC is responsible for converting an optical or electrical signal to a data packet, checking validity of the data packet, and forwarding the data packet to the forwarding chip for processing. In some embodiments, the central processing unit may also perform a function of the forwarding chip, for example, implement software forwarding based on a general-purpose CPU, so that the interface board does not need the forwarding chip. A communication connection between the main control board, the interface board, and the switching board may be implemented through a bus. In some embodiments, the forwarding chip may be implemented by using an application-specific integrated circuit (ASIC) or a field programmable gate array (FPGA).

Logically, the device 2100 includes a control plane and a forwarding plane. The control plane includes the main control board and the central processing unit. The forwarding plane includes components for performing forwarding, for example, the memory, the PIC, and the NP. The control plane performs functions such as a function of a router, generating the forwarding table, processing signaling and protocol packets, and configuring and maintaining a status of a device. The control plane delivers the generated forwarding table to the forwarding plane. On the forwarding plane, the NP searches a table based on the forwarding table delivered by the control plane, to forward a packet received by the PIC of the device 2100. The forwarding table delivered by the control plane may be stored in the memory. In some embodiments, the control plane and the forwarding plane may be totally separated, and are not on a same device. The following briefly describes the foregoing process with reference to the embodiment in FIG. 7.

As shown in the method shown in FIG. 7, the first device may receive, by using a physical interface card 2133, the local route monitoring message sent by the network device, and send the local route monitoring message to the CPU 2131 for processing. The CPU 2131 may perform corresponding processing based on the local route monitoring message. For example, the CPU 2131 may store and display the local route monitoring message, or display the connection relationship between the network device and each peer in a topology diagram, or may deliver the first control message and/or the second control message to the network device based on the local route monitoring message.

The first device provided in this embodiment of the present invention may correspond to the first device in the method embodiment in FIG. 7, and may implement functions of the first device and/or various steps and methods implemented by the first device in the foregoing method embodiments. The foregoing is merely a brief example description. For brevity, details are not described herein again.

It should be noted that, there may be one or more main control boards, and when there are a plurality of main control boards, the main control boards may include an active main control board and a standby main control board. There may be one or more interface boards, and a first device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the first device may not need the switching board, and the interface board provides a function of processing service data in an entire system. In a distributed forwarding architecture, the first device may have at least one switching board, and data exchange between a plurality of interface boards is implemented by using the switching board, to provide a large-capacity data exchange and processing capability. Therefore, a data access and processing capability of the first device in the distributed architecture is better than that of the device in the centralized architecture. Optionally, the first device may alternatively be in a form in which there is only one card. To be specific, there is no switching board, and functions of the interface board and the main control board are integrated on the card. In this case, the central processing unit on the interface board and the central processing unit on the main control board may be combined to form one central processing unit on the card, to perform functions obtained by combining the two central processing units. This form of device (for example, a device such as a low-end switch or a router) has a relatively weak data exchange and processing capability. A specific architecture that is to be used depends on a specific networking deployment scenario. This is not limited herein.

Figure 22:
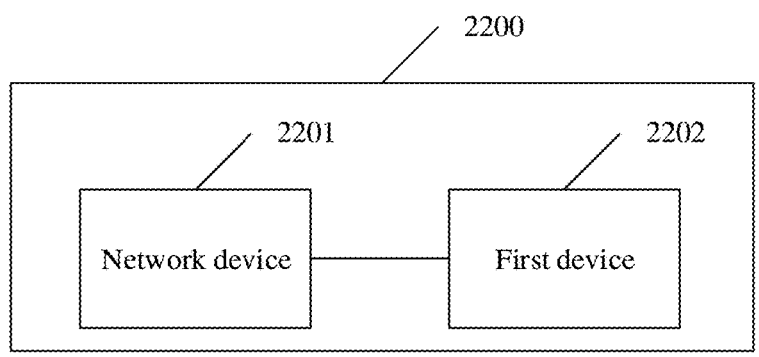
FIG. 22 is a schematic diagram of a structure of a monitoring system according to an embodiment of this application.

Refer to FIG. 22. An embodiment of this application further provides a monitoring system 2200. The system includes a network device 2201 and a first device 2202.

The network device 2201 is configured to obtain a routing prefix included in local routing information and information about a neighboring peer set corresponding to the routing prefix. The neighboring peer set includes a source peer set and/or a destination peer set, the source peer set includes one or more source peers, the source peer is a peer that advertises original routing information including the routing prefix to the network device, the destination peer set includes one or more destination peers, and the destination peer is a peer to which the network device advertises destination routing information including the routing prefix.

The network device 2201 is further configured to send a local route monitoring message to the first device. The local route monitoring message includes the routing prefix and the information about the neighboring peer set.

The first device 2202 is configured to receive the local route monitoring message sent by the network device. The local route monitoring message includes the routing prefix included in the local routing information of the network device and the information about the neighboring peer set corresponding to the routing prefix.

The first device 2202 is further configured to perform corresponding processing based on the routing prefix and the information about the neighboring peer set.

For details of the foregoing steps performed by the network device 2201 and the first device 2202, refer to the descriptions in the foregoing method embodiments. Details are not described herein again.

In addition, an embodiment of this application further provides a computer-readable storage medium, including a computer program. When the computer program runs on a computer, the computer is enabled to perform the information reporting method applied to the network device 2201 or the information processing method applied to the first device 2202.

An embodiment of this application further provides a chip system, including a processor. The processor is coupled to a memory. The memory is configured to store a program or instructions. When the program or the instructions are executed by the processor, the chip system is enabled to implement the method in any one of the foregoing method embodiments.

Optionally, there may be one or more processors in the chip system. The processor may be implemented by hardware, or may be implemented by software. When the processor is implemented through the hardware, the processor may be a logic circuit, an integrated circuit, or the like. When the processor is implemented through the software, the processor may be a general-purpose processor, and is implemented by reading software code stored in the memory.

Optionally, there may also be one or more memories in the chip system. The memory may be integrated with the processor, or may be separated from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated chip (ASIC), a system on chip (SoC), a central processing unit (CPU), a network processor (NP), a digital signal processor (DSP), a micro controller unit (MCU), or a programmable controller (PLD) or another integrated chip.

It should be understood that steps in the foregoing method embodiments may be implemented by using a hardware integrated logical circuit in the processor, or by using instructions in a form of software. The steps of the method disclosed with reference to embodiments of this application may be directly performed and completed by a hardware processor, or may be performed and completed by using a combination of hardware and software modules in the processor.

In this specification, the claims, and the accompanying drawings of this application, terms "first", "second", "third", "fourth", and the like (if existent) are intended to distinguish between similar objects but do not necessarily indicate a specific order or sequence. It should be understood that the terms used in such a way are interchangeable in proper circumstances, so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

In this application, "at least one item (piece)" means one or more, and "a plurality of" means two or more. At least one of the following items (pieces) or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural. In this application, it is considered that "A and/or B" includes only A, only B, and A and B.

Persons skilled in the art may clearly understand that, for convenient and brief description, for detailed working processes of the foregoing system, apparatus, and unit, refer to corresponding processes in the foregoing method embodiments. Details are not described herein again.

In several embodiments provided in this application, it should be understood that the disclosed system, apparatus, and method may be implemented in another manner. For example, the described apparatus embodiments are merely examples. For example, unit division is merely logical module division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be obtained according to actual requirements to achieve the objectives of the solutions of embodiments.

In addition, module units in embodiments of this application may be integrated into one processing unit. Alternatively, each of the units may exist alone physically, or at least two units are integrated into one unit. The integrated unit may be implemented in a form of hardware, or may be implemented in a form of a software module unit.

When the integrated unit is implemented in the form of a software module unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions to enable a computer device (which may be a personal computer, a server, a network device, or the like) to perform all or some of the steps of the methods described in embodiments of this application. The storage medium includes any medium that can store program code, such as a USB flash drive, a removable hard disk, a read-only memory (ROM), a random access memory (RAM), a magnetic disk, or an optical disc.

Persons skilled in the art should be aware that, in the foregoing one or more examples, the functions described in the present invention may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or a special-purpose computer.

The objectives, technical solutions, and beneficial effects of the present invention are further described in detail in the foregoing specific implementations. It should be understood that the foregoing descriptions are merely specific implementations of the present invention.

In conclusion, the foregoing embodiments are merely intended to describe the technical solutions of this application, but are not to limit this application. Although this application is described in detail with reference to the foregoing embodiments, persons of ordinary skill in the art should understand that they may still make modifications to the technical solutions recorded in the foregoing embodiments or make equivalent replacements to some technical features thereof. However, these modifications or replacements do not make the essence of the corresponding technical solutions depart from the scope of the technical solutions of embodiments of this application.

What is claimed is:

1. An information processing method, comprising:
   receiving, by a first device, a local route monitoring message sent by a network device, wherein the local route monitoring message comprises a routing prefix, comprised in local routing information of the network device, and information about a neighboring peer set corresponding to the routing prefix, wherein the neighboring peer set comprises at least one of a source peer set or a destination peer set, wherein the source peer set comprises one or more source peers, wherein the source peer is a peer that advertises original routing information comprising the routing prefix to the network device, wherein the destination peer set comprises one or more destination peers, and wherein the destination peer is a peer to which the network device advertises destination routing information comprising the routing prefix; and
   performing, by the first device, processing based on the routing prefix and the information about the neighboring peer set.

2. The method according to claim 1, wherein the source peer set comprises at least one of a source selected peer set or a source candidate peer set;
   wherein the original routing information comprises first original routing information, wherein the first original routing information is original routing information that is selected by the network device, wherein the source selected peer set comprises one or more source selected peers, and wherein the source selected peer is a source peer that advertises the first original routing information to the network device; and
   wherein the original routing information further comprises second original routing information, wherein the second original routing information is original routing information that is not selected by the network device, wherein the source candidate peer set comprises one or more source candidate peers, and wherein the source candidate peer is a source peer that advertises the second original routing information to the network device.

3. The method according to claim 1, wherein the destination peer set comprises at least one of a destination selected peer set or a destination candidate peer set;
   wherein the destination selected peer set comprises one or more destination selected peers, and wherein the destination selected peer is a peer to which the network device has advertised the destination routing information; and
   wherein the destination candidate peer set comprises one or more destination candidate peers, and wherein the destination candidate peer is a peer to which the network device alternatively advertises but has not advertised the destination routing information.

4. The method according to claim 3, wherein the performing, by the first device, processing based on the routing prefix and the information about the neighboring peer set comprises:
   sending, by the first device, a first control message to the network device, wherein the first control message comprises at least one of first indication information or second indication information, wherein the first indication information indicates to determine one or more destination selected peers in the destination selected peer set as destination candidate peers, and wherein the second indication information indicates to the network device to determine one or more destination candidate peers in the destination candidate peer set as destination selected peers.

5. The method according to claim 4, wherein the method further comprises at least one of:
   obtaining, by the first device, the first indication information based on the routing prefix and information about the destination selected peer set; or
   obtaining, by the first device, the second indication information based on the routing prefix and information about the destination candidate peer set.

6. The method according to claim 1, wherein the original routing information comprises attribute information of the source peer, wherein the destination routing information comprises attribute information of the destination peer, and wherein the performing, by the first device, processing based on the routing prefix and the information about the neighboring peer set comprises:
   sending, by the first device, a second control message to the network device, wherein the second control message comprises at least one of a first routing policy set or a second routing policy set;
   wherein the first routing policy set comprises routing policies of the one or more source peers, wherein the attribute information of the source peer is adjusted based on the routing policy of the source peer; and
   wherein the second routing policy set comprises routing policies of the one or more destination peers, wherein the attribute information of the destination peer is adjusted based on the routing policy of the destination peer.

7. The method according to claim 6, wherein the method further comprises at least one of:
   obtaining, by the first device, the first routing policy set based on the routing prefix and information about the source peer set; or
   obtaining, by the first device, the second routing policy set based on the routing prefix and information about the destination peer set.

8. An information processing apparatus, comprising:
   a receiving unit, configured to receive a local route monitoring message sent by a network device, wherein the local route monitoring message comprises a routing prefix comprised in local routing information of the network device, and information about a neighboring peer set corresponding to the routing prefix, wherein the neighboring peer set comprises at least one of a source peer set or a destination peer set, wherein the source peer set comprises one or more source peers, wherein the source peer is a peer that advertises original routing information comprising the routing prefix to the network device, wherein the destination peer set comprises one or more destination peers, and wherein the destination peer is a peer to which the network device advertises destination routing information comprising the routing prefix; and a processing unit, configured to perform corresponding processing based on the routing prefix and the information about the neighboring peer set.

9. The apparatus according to claim 8, wherein the source peer set comprises at least one of a source selected peer set or a source candidate peer set;

wherein the original routing information comprises first original routing information, wherein the first original routing information is original routing information that is selected by the network device, wherein the source selected peer set comprises one or more source selected peers, and wherein the source selected peer is a source peer that advertises the first original routing information to the network device; and wherein the original routing information comprises second original routing information, wherein the second original routing information is original routing information that is not selected by the network device, wherein the source candidate peer set comprises one or more source candidate peers, and wherein the source candidate peer is a source peer that advertises the second original routing information to the network device.

10. The apparatus according to claim 8, wherein the destination peer set comprises at least one of a destination selected peer set or a destination candidate peer set;

wherein the destination selected peer set comprises one or more destination selected peers, and the destination selected peer is a peer to which the network device has advertised the destination routing information; and wherein the destination candidate peer set comprises one or more destination candidate peers, and the destination candidate peer is a peer to which the network device alternatively advertises but has not advertised the destination routing information.

11. The apparatus according to claim 10, wherein the processing unit is configured to send a first control message to the network device, wherein the first control message comprises at least one of first indication information or second indication information, wherein the first indication information indicates to determine one or more destination selected peers in the destination selected peer set as destination candidate peers, and wherein the second indication information indicates to the network device to determine one or more destination candidate peers in the destination candidate peer set as destination selected peers.

12. The apparatus according to claim 11, wherein the apparatus further comprises a first information generation unit, wherein the first information generation unit is configured to at least one of:

obtain the first indication information based on the routing prefix and information about the destination selected peer set; or obtain the second indication information based on the routing prefix and information about the destination candidate peer set.

13. The apparatus according to claim 8, wherein the processing unit is configured to send a second control message to the network device, wherein the second control message comprises at least one of a first routing policy set or a second routing policy set;

wherein the first routing policy set comprises routing policies of the one or more source peers, wherein attribute information of the source peer is adjusted based on the routing policy of the source peer; and wherein the second routing policy set comprises routing policies of the one or more destination peers, wherein the attribute information of the destination peer is adjusted based on the routing policy of the destination peer.

14. The apparatus according to claim 13, wherein the apparatus further comprises a second information generation unit configured to at least one of:

obtain the first routing policy set based on the routing prefix and information about the source peer set; or obtain the second routing policy set based on the routing prefix and information about the destination peer set.

15. The apparatus according to claim 8, wherein the processing unit is configured to generate a correspondence between the routing prefix and the information about the neighboring peer set.

16. A monitoring system, comprising:

a network device configured to:

obtain a routing prefix comprised in local routing information and information about a neighboring peer set corresponding to the routing prefix, wherein the neighboring peer set comprises at least one of a source peer set or a destination peer set, wherein the source peer set comprises one or more source peers, wherein the source peer is a peer that advertises original routing information comprising the routing prefix to the network device, wherein the destination peer set comprises one or more destination peers, and wherein the destination peer is a peer to which the network device advertises destination routing information comprising the routing prefix;

send a local route monitoring message to a first device, wherein the local route monitoring message comprises the routing prefix and the information about the neighboring peer set; and the first device configured to:

receive the local route monitoring message sent by the network device, wherein the local route monitoring message comprises the routing prefix comprised in the local routing information of the network device, and the information about the neighboring peer set corresponding to the routing prefix; and perform processing based on the routing prefix and the information about the neighboring peer set.

17. The monitoring system according to claim 16, wherein the destination peer set comprises at least one of a destination selected peer set or a destination candidate peer set;

wherein the destination selected peer set comprises one or more destination selected peers, and the destination selected peer is a peer to which the network device has advertised the destination routing information; and wherein the destination candidate peer set comprises one or more destination candidate peers, and the destination candidate peer is a peer to which the network device alternatively advertises but has not advertised the destination routing information.

18. The monitoring system according to claim 17, wherein the first device is further configured to send a first control message to the network device, wherein the first control message comprises at least one of first indication information or second indication information, wherein the first indication information indicates to determine one or more destination selected peers in the destination selected peer set as destination candidate peers, and wherein the second indication information indicates to the network device to determine one or more destination candidate peers in the destination candidate peer set as destination selected peers.

19. The monitoring system according to claim 18, wherein the first device is further configured to at least one of:
- obtain the first indication information based on the routing prefix and information about the destination selected peer set; or
- obtain the second indication information based on the routing prefix and information about the destination candidate peer set.

20. The monitoring system according to claim 16, wherein the first device is further configured to send a second control message to the network device, wherein the second control message comprises at least one of a first routing policy set or a second routing policy set;
- wherein the first routing policy set comprises routing policies of the one or more source peers, wherein attribute information of the source peer is adjusted based on the routing policy of the source peer; and
- wherein the second routing policy set comprises routing policies of the one or more destination peers, wherein the attribute information of the destination peer is adjusted based on the routing policy of the destination peer.

* * * * *